(12) United States Patent
Lim et al.

(10) Patent No.: US 10,834,404 B2
(45) Date of Patent: Nov. 10, 2020

(54) IMAGE ENCODING/DECODING METHOD AND RECORDING MEDIUM FOR SAME

(71) Applicant: Electronics and Telecommunications Research Institute, Daejeon (KR)

(72) Inventors: Sung Chang Lim, Daejeon (KR); Jung Won Kang, Daejeon (KR); Ha Hyun Lee, Seoul (KR); Dong San Jun, Daejeon (KR); Hyun Suk Ko, Daejeon (KR); Jin Ho Lee, Daejeon (KR); Seung Hyun Cho, Daejeon (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/099,998

(22) PCT Filed: May 23, 2017

(86) PCT No.: PCT/KR2017/005351
§ 371 (c)(1),
(2) Date: Nov. 8, 2018

(87) PCT Pub. No.: WO2017/204532
PCT Pub. Date: Nov. 30, 2017

(65) Prior Publication Data
US 2019/0141334 A1      May 9, 2019

(30) Foreign Application Priority Data
May 24, 2016  (KR) ........................ 10-2016-0063644

(51) Int. Cl.
*H04N 19/139*     (2014.01)
*H04N 19/117*     (2014.01)
(Continued)

(52) U.S. Cl.
CPC ......... *H04N 19/139* (2014.11); *H04N 19/117* (2014.11); *H04N 19/124* (2014.11);
(Continued)

(58) Field of Classification Search
CPC ..... H04N 19/139; H04N 19/117; H04N 19/51
(Continued)

(56) References Cited

U.S. PATENT DOCUMENTS

| 2004/0057523 | A1* | 3/2004 | Koto | ....................... H04B 1/662 375/240.26 |
| 2011/0176612 | A1* | 7/2011 | Tsai | ....................... H04N 19/56 375/240.16 |

(Continued)

FOREIGN PATENT DOCUMENTS

| KR | 10-0772576 B1 | 11/2007 |
| KR | 10-2010-0106811 A | 10/2010 |

(Continued)

OTHER PUBLICATIONS

International Search Report dated Aug. 22, 2017 in counterpart International Patent Application No. PCT/KR2017/005351 (4 pages, in Korea with English translation).

*Primary Examiner* — Jeffrey A Williams
(74) *Attorney, Agent, or Firm* — NSIP Law

(57) ABSTRACT

The present invention relates to a method of performing motion compensation by using motion vector prediction. To this end, a method of decoding an image may include: generating multiple motion vector candidate lists according to an inter-prediction direction of a current block; deriving multiple motion vectors for the current block by using the multiple motion vector candidate lists; determining multiple prediction blocks for the current block by using the multiple motion vectors; and obtaining a final prediction block for the current block based on the multiple prediction blocks.

6 Claims, 15 Drawing Sheets

(51) Int. Cl.
*H04N 19/51* (2014.01)
*H04N 19/52* (2014.01)
*H04N 19/124* (2014.01)
*H04N 19/91* (2014.01)

(52) U.S. Cl.
CPC ............ *H04N 19/51* (2014.11); *H04N 19/52* (2014.11); *H04N 19/91* (2014.11)

(58) Field of Classification Search
USPC .................................................. 375/240.02
See application file for complete search history.

(56) References Cited

U.S. PATENT DOCUMENTS

| | | | |
|---|---|---|---|
| 2013/0022124 A1* | 1/2013 | Sekiguchi | H04N 19/105 375/240.16 |
| 2013/0235933 A1 | 9/2013 | Sasai et al. | |
| 2013/0322535 A1 | 12/2013 | Lim et al. | |
| 2014/0219357 A1 | 8/2014 | Chuang et al. | |
| 2014/0307789 A1 | 10/2014 | Kim et al. | |
| 2016/0021388 A1 | 1/2016 | Yang et al. | |
| 2016/0142728 A1 | 5/2016 | Wang et al. | |
| 2016/0249066 A1* | 8/2016 | Heo | H04N 19/597 |
| 2017/0332099 A1* | 11/2017 | Lee | H04N 19/122 |
| 2018/0131943 A1* | 5/2018 | Park | H04N 19/126 |

FOREIGN PATENT DOCUMENTS

| | | | |
|---|---|---|---|
| KR | 10-2014-0122189 A | 10/2014 | |
| KR | 10-2016-0046319 A | 4/2016 | |
| WO | WO 01/86962 A1 | 11/2001 | |

* cited by examiner

FIG. 7

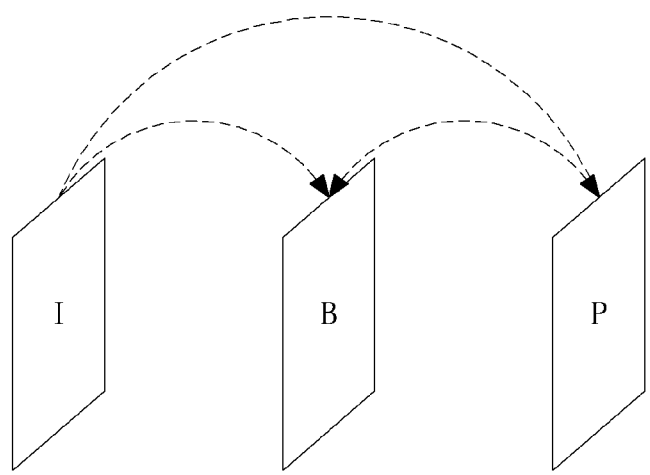

FIG.8

| Intra Prediction Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertical direction transform set | 2 | 1 | 0 | 1 | 0 | 1 | 0 | 1 | 0 | 1 | 0 | 1 | 0 | 1 | 0 | 0 | 0 | 0 |
| horizontal direction transform set | 2 | 1 | 0 | 1 | 0 | 1 | 0 | 1 | 0 | 1 | 0 | 1 | 0 | 1 | 2 | 2 | 2 | 2 |
| Intra Prediction Mode | 18 | 19 | 20 | 21 | 22 | 23 | 24 | 25 | 26 | 27 | 28 | 29 | 30 | 31 | 32 | 33 | 34 | |
| vertical direction transform set | 0 | 0 | 0 | 0 | 0 | 1 | 0 | 1 | 0 | 1 | 0 | 1 | 0 | 1 | 0 | 1 | 0 | |
| horizontal direction transform set | 2 | 2 | 2 | 2 | 2 | 1 | 0 | 1 | 0 | 1 | 0 | 1 | 0 | 1 | 0 | 1 | 0 | |
| Intra Prediction Mode | 35 | 36 | 37 | 38 | 39 | 40 | 41 | 42 | 43 | 44 | 45 | 46 | 47 | 48 | 49 | 50 | 51 | 52 |
| vertical direction transform set | 1 | 0 | 1 | 0 | 1 | 0 | 1 | 0 | 1 | 0 | 1 | 2 | 2 | 2 | 2 | 2 | 2 | 2 |
| horizontal direction transform set | 1 | 0 | 1 | 0 | 1 | 0 | 1 | 0 | 1 | 0 | 1 | 0 | 0 | 0 | 0 | 0 | 0 | 0 |
| Intra Prediction Mode | 53 | 54 | 55 | 56 | 57 | 58 | 59 | 60 | 61 | 62 | 63 | 64 | 65 | 66 | | | | |
| vertical direction transform set | 2 | 2 | 1 | 0 | 1 | 0 | 1 | 0 | 1 | 0 | 1 | 0 | 1 | 0 | | | | |
| horizontal direction transform set | 0 | 0 | 1 | 0 | 1 | 0 | 1 | 0 | 1 | 0 | 1 | 0 | 1 | 0 | | | | |

Diagonal    Horizontal    Vertical

FIG. 17
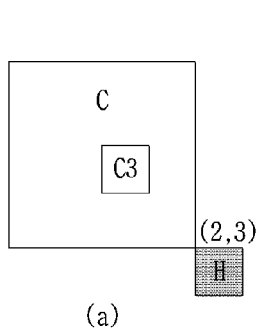
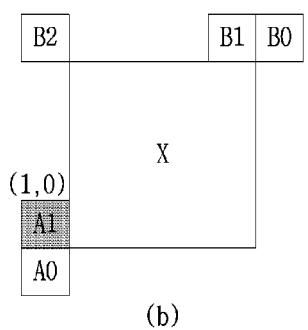
(a)  (b)  (c)

FIG. 18
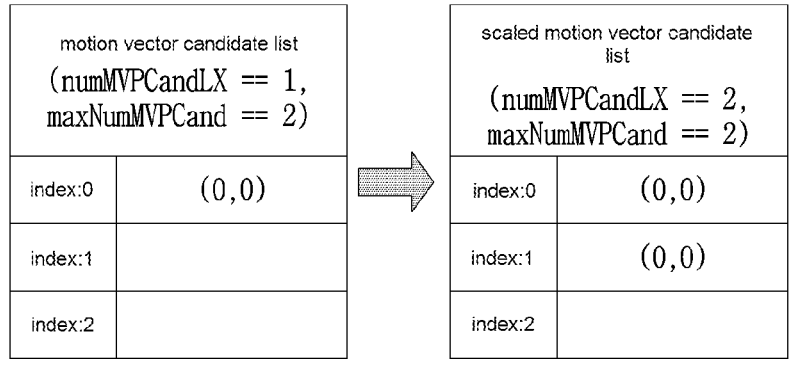
(a)
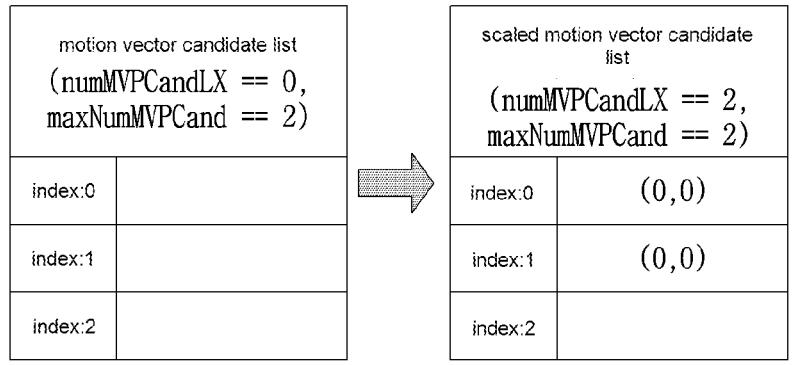
(b)
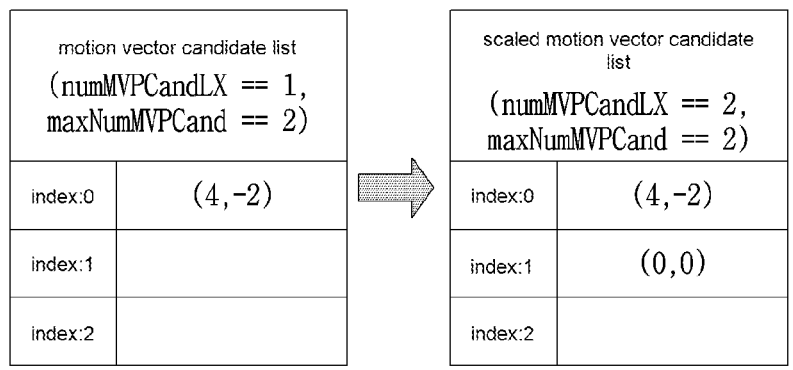
(c)

FIG. 19

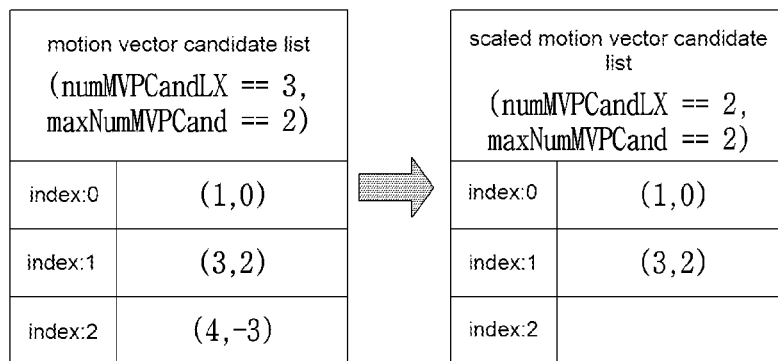

FIG. 20

| motion vector candidate list | | | motion vector | | inter-prediction indicator |
|---|---|---|---|---|---|
| motion vector candidate index | motion vector candidate | | | | |
| | first motion vector candidate | second motion vector candidate | first motion vector | second motion vector | |
| 0 | mvLXA | - | mvLXA + MVD | - | PRED_LX |
| 1 | mvLXB | - | mvLXB + MVD | - | PRED_LX |
| 2 | mvLXCol | - | mvLXCol + MVD | - | PRED_LX |
| 3 | mvZero | - | mvZero + MVD | - | PRED_LX |
| 4 | mvLXA | mvLXB | mvLXA + MVD | mvLXB | PRED_BI_LX |
| 5 | mvLXB | mvLXA | mvLXB + MVD | mvLXA | PRED_BI_LX |
| 6 | mvLXA | mvLXCol | mvLXA + MVD | mvLXCol | PRED_BI_LX |
| 7 | mvLXA | mvLXCol | mvLXA | mvLXCol + MVD | PRED_BI_LX |
| 8 | mvLXA | mvZero | mvLXA + MVD | mvZero | PRED_BI_LX |
| 9 | mvLXA | mvZero | mvLXA | mvZero + MVD | PRED_BI_LX |
| 10 | mvLXB | mvLXCol | mvLXB + MVD | mvLXCol | PRED_BI_LX |
| 11 | mvLXB | mvLXCol | mvLXB | mvLXCol + MVD | PRED_BI_LX |
| 12 | mvLXB | mvZero | mvLXB + MVD | mvZero | PRED_BI_LX |
| 13 | mvLXB | mvZero | mvLXB | mvZero + MVD | PRED_BI_LX |

| | |
|---|---|
| }else{ | |
|   if(slice_type == B) | |
|     inter_pred_idc[x0][y0] | ae(v) |
|   if(inter_pred_idc[x0][y0] != PRED_L1 ) { | |
|     if(num_ref_idx_l0_active_minus1 >0) | |
|       ref_idx_l0[x0][y0] | ae(v) |
|     mvd_coding(x0,y0,0) | |
|     mvp_l0_idx[x0][y0] | ae(v) |
|     wf_l0[x0][y0] | ae(v) |
|     offset_l0[x0][y0] | ae(v) |
|   } | |
|   if(inter_pred_idc[x0][y0] != PRED_L0){ | |
|     if(num_ref_idx_l1_active_minus1>0) | |
|       ref_idx_l1[x0][y0] | ae(v) |
|     if(mvd_l1_zero_flag && inter_pred_idc[x0][y0] == PRED_BI){ | |
|       MvdL1[x0][y0][0] = 0 | |
|       MvdL1[x0][y0][1] = 0 | |
|     }else | |
|       mvd_coding(x0,y0,1) | |
|     mvp_l1_idx[x0][y0] | ae(v) |
|     wf_l1[x0][y0] | ae(v) |
|     offset_l1[x0][y0] | ae(v) |
|   } | |

| | |
|---|---|
| if(inter_pred_idc[x0][y0]!=PRED_BI && inter_pred_idc[x0][y0]!=PRED_L0 && inter_pred_idc[x0][y0]!=PRED_L1){ | |
|     if(num_ref_idx_l2_active_minus1 >0) | |
|         ref_idx_l2[x0][y0] | ae(v) |
|     mvd_coding(x0,y0,0) | |
|     mvp_l2_idx[x0][y0] | ae(v) |
|     wf_l2[x0][y0] | ae(v) |
|     offset_l2[ x0 ][ y0 ] | ae(v) |
| } | |
| if(inter_pred_idc[x0][y0]!=PRED_BI && inter_pred_idc[x0][y0]!=PRED_L0 && inter_pred_idc[x0][y0]!=PRED_L1 && inter_pred_idc[x0][y0]!=PRED_TRI) { | |
|     if(num_ref_idx_l3_active_minus1>0) | |
|         ref_idx_l3[x0][y0] | ae(v) |
|     mvd_coding(x0,y0,0) | |
|     mvp_l3_idx[x0][y0] | ae(v) |
|     wf_l3[x0][y0]I | ae(v) |
|     offset_l3[x0][y0] | ae(v) |
|   } | |
| } | |

(b)

IMAGE ENCODING/DECODING METHOD AND RECORDING MEDIUM FOR SAME

CROSS REFERENCE TO RELATED APPLICATIONS

This application is a U.S. National Stage Application of International Application No. PCT/KR2017/005351, filed on May 23, 2017, which claims the benefit under 35 USC 119(a) and 365(b) of Korean Patent Application No. 10-2016-0063644, filed on May 24, 2016, in the Korean Intellectual Property Office.

TECHNICAL FIELD

The present invention relates to a method and apparatus for encoding/decoding an image. More particularly, the present invention relates to a method and apparatus for performing motion compensation by using motion vector prediction.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

In conventional motion compensation, only a spatial motion vector candidate, a temporal motion vector candidate, and a zero motion vector candidate are added to a motion vector candidate list to be used, and only uni-directional prediction and bi-directional prediction are used, and thus there are limitations to enhance encoding efficiency.

DISCLOSURE

Technical Problem

The present invention may provide a method and apparatus for performing motion compensation by using combined motion vector candidates to enhance encoding/decoding efficiency of an image.

The present invention may provide a method and apparatus for performing motion compensation by using uni-directional prediction, bi-directional prediction, tri-directional prediction, and quad-directional prediction to enhance encoding/decoding efficiency of an image.

Technical Solution

According to the present invention, a method of decoding an image may include: generating multiple motion vector candidate lists according to an inter-prediction direction of a current block; deriving multiple motion vectors for the current block by using the multiple motion vector candidate lists; determining multiple prediction blocks for the current block by using the multiple motion vectors; and obtaining a final prediction block for the current block based on the multiple prediction blocks.

According to the present invention, a method of encoding an image may include: generating multiple motion vector candidate lists according to an inter-prediction direction of a current block; deriving multiple motion vectors for the current block by using the multiple motion vector candidate lists; determining multiple prediction blocks for the current block by using the multiple motion vectors; and obtaining a final prediction block for the current block based on the multiple prediction blocks.

According to the method of encoding/decoding an image, the inter-prediction direction may indicate uni-directional or multi-directional prediction, and the multi-directional prediction may include tri-directional prediction or more.

According to the method of encoding/decoding an image, the motion vector candidate list may be generated for each a reference picture list.

According to the method of encoding/decoding an image, the motion vector candidate list may include at least one of a spatial motion vector candidate derived from a spatial neighboring block of the current block, a temporal motion vector candidate derived from a collocated block of the current block, and a motion vector candidate of a predefined value.

According to the method of encoding/decoding an image, the motion vector candidate list may include a combined motion vector candidate generated by combining at least two of: the spatial motion vector candidate, the temporal motion vector candidate, and the motion vector candidate of the predefined value.

According to the method of encoding/decoding an image, the final prediction block may be determined based on a weighted sum of the multiple prediction blocks.

According to the method of encoding/decoding an image, a weighting being applied to the multiple prediction blocks may be determined based on a weighting prediction value and a weighting difference value.

Advantageous Effects

In the present invention, provided is a method and apparatus for performing motion compensation by using combined motion vector candidates to enhance encoding/decoding efficiency of an image.

In the present invention, provided is a method and apparatus for performing motion compensation by using uni-directional prediction, bi-directional prediction, tri-directional prediction, and quad-directional prediction to enhance encoding/decoding efficiency of an image.

DESCRIPTION OF DRAWINGS

FIG. 7 is a view for explaining an embodiment of a process of inter prediction.

FIG. 8 is a view for explaining transform sets according to intra-prediction modes.

FIG. 17 is a view illustrating an example of generating a motion vector candidate list.

FIG. 18 is a view illustrating an example of adding a motion vector having a predetermined value to a motion vector candidate list.

FIG. 19 is a view illustrating an example of removing a motion vector candidate from a motion vector candidate list.

FIG. 20 is a view illustrating an example of a motion vector candidate list.

FIG. 22 is a view illustrating an example of syntax for information about motion compensation.

MODE FOR INVENTION

Figure 1:
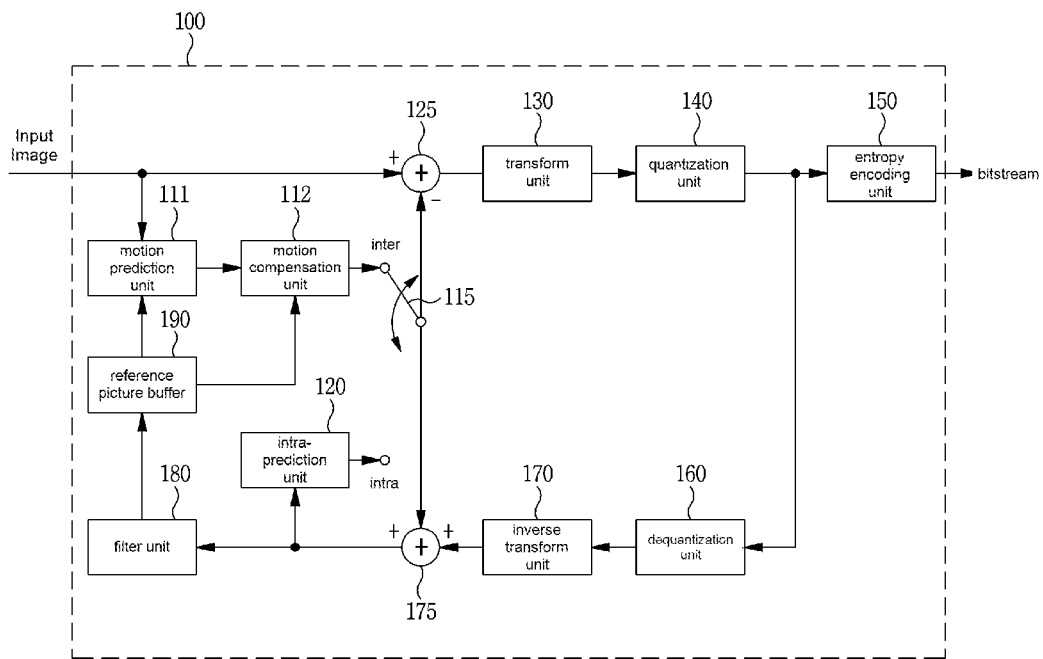
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Term Description

Encoder: may mean an apparatus performing encoding.

Decoder: may mean an apparatus performing decoding.

Parsing: may mean determination of a value of a syntax element by performing entropy decoding, or may mean the entropy decoding itself.

Block: may mean a sample of an M×N matrix. Here, M and N are positive integers, and the block may mean a sample matrix in a two-dimensional form.

Sample: is a basic unit of a block, and may indicate a value ranging 0 to 2 Bd−1 depending on the bit depth (Bd). The sample may mean a pixel in the present invention.

Unit: may mean a unit of encoding and decoding of an image. In encoding and decoding an image, the unit may be an area generated by partitioning one image. In addition, the unit may mean a subdivided unit when one image is partitioned into subdivided units during encoding or decoding. In encoding and decoding an image, a predetermined process for each unit may be performed. One unit may be partitioned into sub units that have sizes smaller than the size of the unit. Depending on functions, the unit may mean a block, a macroblock, a coding tree unit, a coding tree block, a coding unit, a coding block, a prediction unit, a prediction block, a transform unit, a transform block, etc. In addition, in order to distinguish a unit from a block, the unit may include a luma component block, a chroma component block of the luma component block, and a syntax element of each color component block. The unit may have various sizes and shapes, and particularly, the shape of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Reconstructed Neighbor Unit: may mean a reconstructed unit that is previously spatially/temporally encoded or decoded, and the reconstructed unit is adjacent to an encoding/decoding target unit. Here, a reconstructed neighbor unit may mean a reconstructed neighbor block.

Neighbor Block: may mean a block adjacent to an encoding/decoding target block. The block adjacent to the encoding/decoding target block may mean a block having a boundary being in contact with the encoding/decoding target block. The neighbor block may mean a block located at an adjacent vertex of the encoding/decoding target block. The neighbor block may mean a reconstructed neighbor block.

Unit Depth: may mean a partitioned degree of a unit. In a tree structure, a root node may be the highest node, and a leaf node may be the lowest node.

Symbol: may mean a syntax element of the encoding/decoding target unit, a coding parameter, a value of a transform coefficient, etc.

Parameter Set: may mean header information in a structure of the bitstream. The parameter set may include at least one of a video parameter set, a sequence parameter set, a picture parameter set, or an adaptation parameter set. In addition, the parameter set may mean slice header information and tile header information, etc.

Bitstream: may mean a bit string including encoded image information.

Prediction Unit: may mean a basic unit when performing inter prediction or intra prediction, and compensation for the prediction. One prediction unit may be partitioned into a plurality of partitions. In this case, each of the plurality of partitions may be a basic unit while performing the predictions and the compensation, and each partition partitioned from the prediction unit may be a prediction unit. In addition, one prediction unit may be partitioned into a plurality of small prediction units. A prediction unit may have various sizes and shapes, and particularly, the shape of the prediction unit may be a two-dimensional geometrical figure such as a rectangular shape, a square shape, a trapezoid shape, a triangular shape, a pentagonal shape, etc.

Prediction Unit Partition: may mean the shape of a partitioned prediction unit.

Reference Picture List: may mean a list including at least one reference picture that is used for inter prediction or motion compensation. Types of the reference picture list may be List Combined (LC), List 0 (L0), List 1 (L1), List 2 (L2), List 3 (L3), etc. At least one reference picture list may be used for inter prediction.

Inter-Prediction Indicator: may mean one of the inter-prediction direction (one-way directional prediction, bidirectional prediction, etc.) of an encoding/decoding target block in a case of inter prediction, the number of reference pictures used for generating a prediction block by the encoding/decoding target block, and the number of reference blocks used for performing inter prediction or motion compensation by the encoding/decoding target block.

Reference Picture Index: may mean an index of a specific reference picture in the reference picture list.

Reference Picture: may mean a picture to which a specific unit refers for inter prediction or motion compensation. A reference image may be referred to as the reference picture.

Motion Vector: is a two-dimensional vector used for inter prediction or motion compensation, and may mean an offset between an encoding/decoding target picture and the reference picture. For example, (mvX, mvY) may indicate the motion vector, mvX may indicate a horizontal component, and mvY may indicate a vertical component.

Motion Vector Candidate: may mean a unit that becomes a prediction candidate when predicting the motion vector, or may mean a motion vector of the unit.

Motion Vector Candidate List: may mean a list configured by using the motion vector candidate.

Motion Vector Candidate Index: may mean an indicator that indicates the motion vector candidate in the motion vector candidate list. The motion vector candidate index may be referred to as an index of a motion vector predictor.

Motion Information: may mean the motion vector, the reference picture index, and inter-prediction indicator as well as information including at least one of reference picture list information, the reference picture, the motion vector candidate, the motion vector candidate index, etc.

Merge Candidate List: may mean a list configured by using the merge candidate.

Merge Candidate: may include a spatial merge candidate, a temporal merge candidate, a combined merge candidate, a combined bi-prediction merge candidate, a zero merge candidate, etc. The merge candidate may include motion information such as prediction type information, a reference picture index for each list, a motion vector, etc.

Merge Index: may mean information indicating the merge candidate in the merge candidate list. In addition, the merge index may indicate a block, which derives the merge candidate, among reconstructed blocks spatially/temporally adjacent to the current block. In addition, the merge index may indicate at least one of pieces of motion information of the merge candidate.

Transform Unit: may mean a basic unit when performing encoding/decoding of a residual signal, similar to transform, inverse transform, quantization, dequantization, and transform coefficient encoding/decoding. One transform unit may be partitioned into a plurality of small transform units. The transform unit may have various sizes and shapes. Particularly, the shape of the transform unit may be a two-dimensional geometrical figure such as a rectangular shape, a square shape, a trapezoid shape, a triangular shape, a pentagonal shape, etc.

Scaling: may mean a process of multiplying a factor to a transform coefficient level, and as a result, a transform coefficient may be generated. The scaling may be also referred to as dequantization.

Quantization Parameter: may mean a value used in scaling the transform coefficient level during quantization and dequantization. Here, the quantization parameter may be a value mapped to a step size of the quantization.

Delta Quantization Parameter: may mean a difference value between a predicted quantization parameter and a quantization parameter of the encoding/decoding target unit.

Scan: may mean a method of sorting coefficient orders within a block or a matrix. For example, sorting a two-dimensional matrix into a one-dimensional matrix may be referred to as scanning, and sorting a one-dimensional matrix into a two-dimensional matrix may be referred to as scanning or inverse scanning.

Transform Coefficient: may mean a coefficient value generated after performing a transform. In the present invention, a quantized transform coefficient level that is a transform coefficient to which the quantization is applied may be referred to as the transform coefficient.

Non-zero Transform Coefficient: may mean a transform coefficient in which a value thereof is not 0, or may mean a transform coefficient level in which a value thereof is not 0.

Quantization Matrix: may mean a matrix used in quantization and dequantization in order to enhance subject quality or object quality of an image. The quantization matrix may be referred to as a scaling list.

Quantization Matrix Coefficient: may mean each element of a quantization matrix. The quantization matrix coefficient may be referred to as a matrix coefficient.

Default Matrix: may mean a predetermined quantization matrix that is defined in the encoder and the decoder in advance.

Non-default Matrix: may mean a quantization matrix that is transmitted/received by a user without being previously defined in the encoder and the decoder.

Coding Tree Unit: may be composed of one luma component (Y) coding tree unit and related two chroma components (Cb, Cr) coding tree units. Each coding tree unit may be partitioned by using at least one partition method such as a quad tree, a binary tree, etc. to configure sub units such as coding units, prediction units, transform units, etc. The coding tree unit may be used as a term for indicating a pixel block that is a processing unit in decoding/encoding process of an image, like partition of an input image.

Coding Tree Block: may be used as a term for indicating one of the Y coding tree unit, the Cb coding tree unit, and the Cr coding tree unit.

FIG. 1 is a block diagram showing configurations of an encoding apparatus according to an embodiment of the present invention.

The encoding apparatus 100 may be a video encoding apparatus or an image encoding apparatus. A video may include one or more images. The encoding apparatus 100 may encode the one or more images of the video in order of time.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

The encoding apparatus 100 may encode an input picture in an intra mode or an inter mode or both. In addition, the encoding apparatus 100 may generate a bitstream by encoding the input picture, and may output the generated bitstream. When the intra mode is used as a prediction mode, the switch 115 may be switched to intra. When the inter mode is used as a prediction mode, the switch 115 may be switched to inter. Here, the intra mode may be referred to as an intra-prediction mode, and the inter mode may be referred to as an inter-prediction mode. The encoding apparatus 100 may generate a prediction block of an input block of the input picture. In addition, after generating the prediction block, the encoding apparatus 100 may encode residuals between the input block and the prediction block. The input picture may be referred to as a current image that is a target of current encoding. The input block may be referred to as a current block or as an encoding target block that is a target of the current encoding.

When the prediction mode is the intra mode, the intra-prediction unit 120 may use a pixel value of a previously encoded block, which is adjacent to the current block, as a reference pixel. The intra-prediction unit 120 may perform spatial prediction by using the reference pixel, and may generate prediction samples of the input block by using the spatial prediction. Here, intra prediction may mean intra-frame prediction.

When the prediction mode is the inter mode, the motion prediction unit 111 may search for a region that is optimally matched with the input block from a reference picture in a motion predicting process, and may derive a motion vector by using the searched region. The reference picture may be stored in the reference picture buffer 190.

The motion compensation unit 112 may generate the prediction block by performing motion compensation using the motion vector. Here, the motion vector may be a two-dimensional vector that is used for inter prediction. In addition, the motion vector may indicate offset between the current picture and the reference picture. Here, inter prediction may be mean inter-frame prediction.

When a value of the motion vector is not an integer, the motion prediction unit 111 and the motion compensation unit 112 may generate the prediction block by applying an interpolation filter to a partial region in the reference picture. In order to perform inter prediction or motion compensation, on the basis of the coding unit, it is possible to determine which methods the motion prediction and compensation methods of a prediction unit in the coding unit uses among the skip mode, the merge mode, the AMVP mode, and a current picture reference mode. Inter prediction or motion compensation may be performed according to each mode. Here, the current picture reference mode may mean a prediction mode using a pre-reconstructed region of a current picture having an encoding target block. In order to specify the pre-reconstructed region, a motion vector for the current picture reference mode may be defined. Whether the encoding target block is encoded in the current picture reference mode may be encoded by using a reference picture index of the encoding target block.

The subtractor 125 may generate a residual block by using the residuals between the input block and the prediction block. The residual block may be referred to as a residual signal.

The transform unit 130 may generate a transform coefficient by transforming the residual block, and may output the transform coefficient. Here, the transform coefficient may be a coefficient value generated by transforming the residual block. In a transform skip mode, the transform unit 130 may skip the transforming of the residual block.

A quantized transform coefficient level may be generated by applying quantization to the transform coefficient. Hereinafter, the quantized transform coefficient level may be referred to as the transform coefficient in the embodiment of the present invention.

The quantization unit 140 may generate the quantized transform coefficient level by quantizing the transform coefficient depending on the quantization parameter, and may output the quantized transform coefficient level. Here, the quantization unit 140 may quantize the transform coefficient by using a quantization matrix.

The entropy encoding unit 150 may generate the bitstream by performing entropy encoding according to the probability distribution, on values calculated by the quantization unit 140 or on coding parameter values calculated in an encoding process, etc., and may output the generated bitstream. The entropy encoding unit 150 may perform the entropy encoding on information for decoding an image, and on information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression performance of the image encoding may be increased through the entropy encoding. For the entropy encoding, the entropy encoding unit 150 may use an encoding method such as exponential golomb, context-adaptive variable length coding (CAVLC), and context-adaptive binary arithmetic coding (CABAC). For example, the entropy encoding unit 150 may perform the entropy encoding by using a variable length coding/code (VLC) table. In addition, the entropy encoding unit 150 may derive a binarization method of the target symbol and a probability model of the target symbol/bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional form coefficient may be changed into the one-dimensional vector form by scanning the coefficient of the block with up-right scanning. According to the size of the transform unit and the intra-prediction mode, instead of the up-right scanning, it is possible to use vertical direction scanning for scanning the two-dimensional block form coefficient in a column direction, and horizontal direction scanning for scanning the two-dimensional block form coefficient in a row direction. That is, it is possible to determine which scanning method among up-right scanning, vertical direction scanning, and horizontal direction scanning is to be used depending on the size of the transform unit and the intra-prediction mode.

The coding parameter may include information, such as the syntax element, which is encoded by the encoder and is transmitted to the decoder, and may include information that may be derived in the encoding or decoding process. The coding parameter may mean information that is necessary to encode or decode an image. For example, the coding parameter may include at least one value or combined form of the block size, the block depth, the block partition information, the unit size, the unit depth, the unit partition information, the partition flag of a quad-tree form, the partition flag of a binary-tree form, the partition direction of a binary-tree form, the intra-prediction mode, the intra-prediction direction, the reference sample filtering method, the prediction block boundary filtering method, the filter tap, the filter coefficient, the inter-prediction mode, the motion information, the motion vector, the reference picture index, the inter-prediction direction, the inter-prediction indicator, the reference picture list, the motion vector predictor, the motion vector candidate list, the information about whether or not the motion merge mode is used, the motion merge candidate, motion merge candidate list, the information about whether or not the skip mode is used, interpolation filter type, the motion vector size, accuracy of motion vector representation, the transform type, the transform size, the information about whether additional (secondary) transform is used, the information about whether or not a residual signal is present, the coded block pattern, the coded block flag, the quantization parameter, the quantization matrix, the filter information within a loop, the information about whether or not a filter is applied within a loop, the filter coefficient within a loop, binarization/inverse binarization method, the context model, the context bin, the bypass bin, the transform coefficient, transform coefficient level, transform coefficient level scanning method, the image display/output order, slice identification information, slice type, slice partition information, tile identification information, tile type, tile partition information, the picture type, bit depth, and the information of a luma signal or a chroma signal.

The residual signal may mean the difference between the original signal and the prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be the residual signal of a block unit.

When the encoding apparatus 100 performs encoding by using inter prediction, the encoded current picture may be used as a reference picture for another image(s) that will be processed thereafter. Accordingly, the encoding apparatus 100 may decode the encoded current picture, and may store the decoded image as the reference picture. In order to perform the decoding, dequantization and inverse transform may be performed on the encoded current picture.

A quantized coefficient may be dequantized by the dequantization unit 160, and may be inversely transformed by the inverse transform unit 170. The dequantized and inversely transformed coefficient may be added to the prediction block by the adder 175, whereby a reconstructed block may be generated.

The reconstructed block may pass the filter unit 180. The filter unit 180 may apply at least one of a deblocking filter, a sample adaptive offset (SAO), and an adaptive loop filter (ALF) to the reconstructed block or a reconstructed picture. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block on the basis of the pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel.

The sample adaptive offset may add an optimum offset value to the pixel value in order to compensate for an encoding error. The sample adaptive offset may correct an offset between the deblocking filtered image and the original picture for each pixel. In order to perform the offset correction on a specific picture, it is possible to use a method of applying an offset in consideration of edge information of each pixel or a method of partitioning pixels of an image into the predetermined number of regions, determining a region to be subjected to perform an offset correction, and applying the offset correction to the determined region.

The adaptive loop filter may perform filtering on the basis of a value obtained by comparing the reconstructed picture and the original picture. Pixels of an image may be partitioned into predetermined groups, one filter being applied to each of the groups is determined, and different filtering may be performed at each of the groups. Information about whether or not the adaptive loop filter is applied to the luma signal may be transmitted for each coding unit (CU). A shape and a filter coefficient of an adaptive loop filter being applied to each block may vary. In addition, an adaptive loop filter having the same form (fixed form) may be applied regardless of characteristics of a target block.

The reconstructed block that passed the filter unit 180 may be stored in the reference picture buffer 190.

Figure 2:
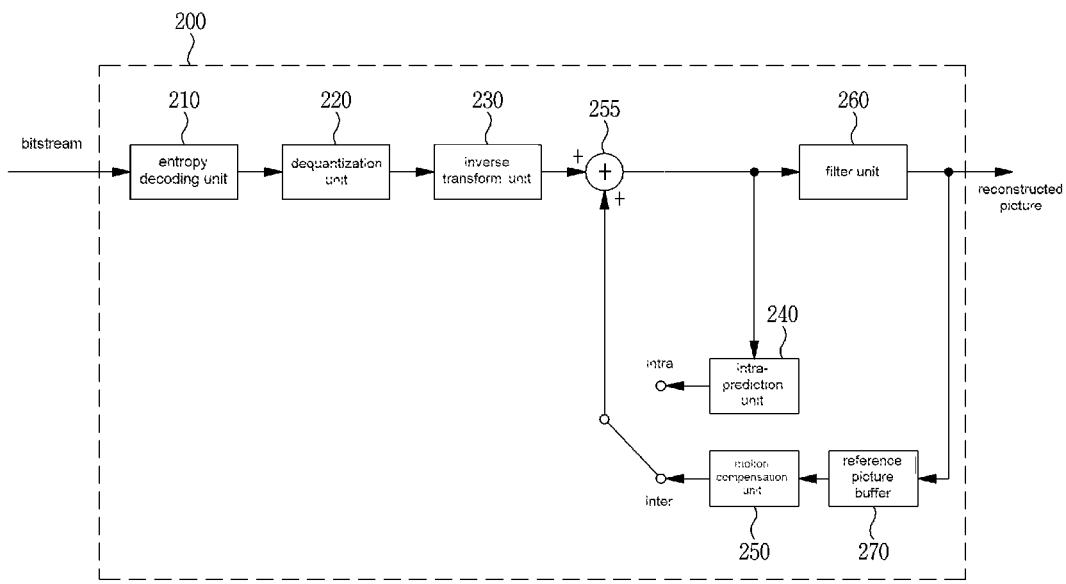
FIG. 2 is a block diagram showing configurations of a decoding apparatus according to an embodiment of the present invention.

FIG. 2 is a block diagram showing configurations of a decoding apparatus according to an embodiment of the present invention.

The decoding apparatus 200 may be a video decoding apparatus or an image decoding apparatus.

Referring to FIG. 2, the decoding apparatus 200 may include an entropy decoding unit 210, a dequantization unit 220, an inverse transform unit 230, an intra-prediction unit 240, a motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed picture by performing decoding, and may output the reconstructed picture.

When a prediction mode used in decoding is the intra mode, the switch may be switched to intra. When the prediction mode used in decoding is the inter mode, the switch may be switched to inter.

The decoding apparatus 200 may obtain the reconstructed residual block from the inputted bitstream, and may generate the prediction block. When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by performing entropy decoding on the bitstream according to the probability distribution. The generated symbols may include a symbol having a quantized transform coefficient level. Here, a method of entropy decoding may be similar to the above-described method of the entropy encoding. For example, the method of the entropy decoding may be an inverse process of the above-described method of the entropy encoding.

In order to decode the transform coefficient level, the entropy decoding unit 210 may perform transform coefficient scanning, whereby the one-dimensional vector form coefficient can be changed into the two-dimensional block form. For example, the one-dimensional vector form coefficient may be changed into a two-dimensional block form by scanning the coefficient of the block with up-right scanning. According to the size of the transform unit and the intra-prediction mode, instead of up-right scanning, it is possible to use vertical direction scanning and horizontal direction scanning. That is, it is possible to determine which scanning method among up-right scanning, vertical direction scanning, and horizontal direction scanning is used depending on the size of the transform unit and the intra-prediction mode.

The quantized transform coefficient level may be dequantized by the dequantization unit 220, and may be inversely transformed by the inverse transform unit 230. The quantized transform coefficient level is dequantized and is inversely transformed so as to generate a reconstructed residual block. Here, the dequantization unit 220 may apply the quantization matrix to the quantized transform coefficient level.

When the intra mode is used, the intra-prediction unit 240 may generate a prediction block by performing the spatial prediction that uses the pixel value of the previously decoded block that is adjacent to the decoding target block.

When the inter mode is used, the motion compensation unit 250 may generate the prediction block by performing motion compensation that uses both the motion vector and the reference picture stored in the reference picture buffer 270. When the value of the motion vector is not an integer, the motion compensation unit 250 may generate the prediction block by applying the interpolation filter to the partial region in the reference picture. In order to perform motion compensation, on the basis of the coding unit, it is possible to determine which method the motion compensation method of a prediction unit in the coding unit uses among the skip mode, the merge mode, the AMVP mode, and a current picture reference mode. In addition, it is possible to perform motion compensation depending on the modes. Here, the current picture reference mode may mean a prediction mode using a previously reconstructed region within the current picture having the decoding target block. The previously reconstructed region may not be adjacent to the decoding target block. In order to specify the previously reconstructed region, a fixed vector may be used for the current picture reference mode. In addition, a flag or an index indicating whether or not the decoding target block is a block decoded in the current picture reference mode may be signaled, and may be derived by using the reference picture index of the decoding target block. The current picture for the current picture reference mode may exist at a fixed position (for example, a position of a reference picture index is 0 or the last position) within the reference picture list for the decoding target block. In addition, it is possible for the current picture to be variably positioned within the reference picture list, and to this end, it is possible to signal the reference picture index indicating a position of the current picture.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed picture. The filter unit 260 may output the reconstructed picture. The reconstructed picture may be stored in the reference picture buffer 270, and may be used for inter prediction.

Figure 3:
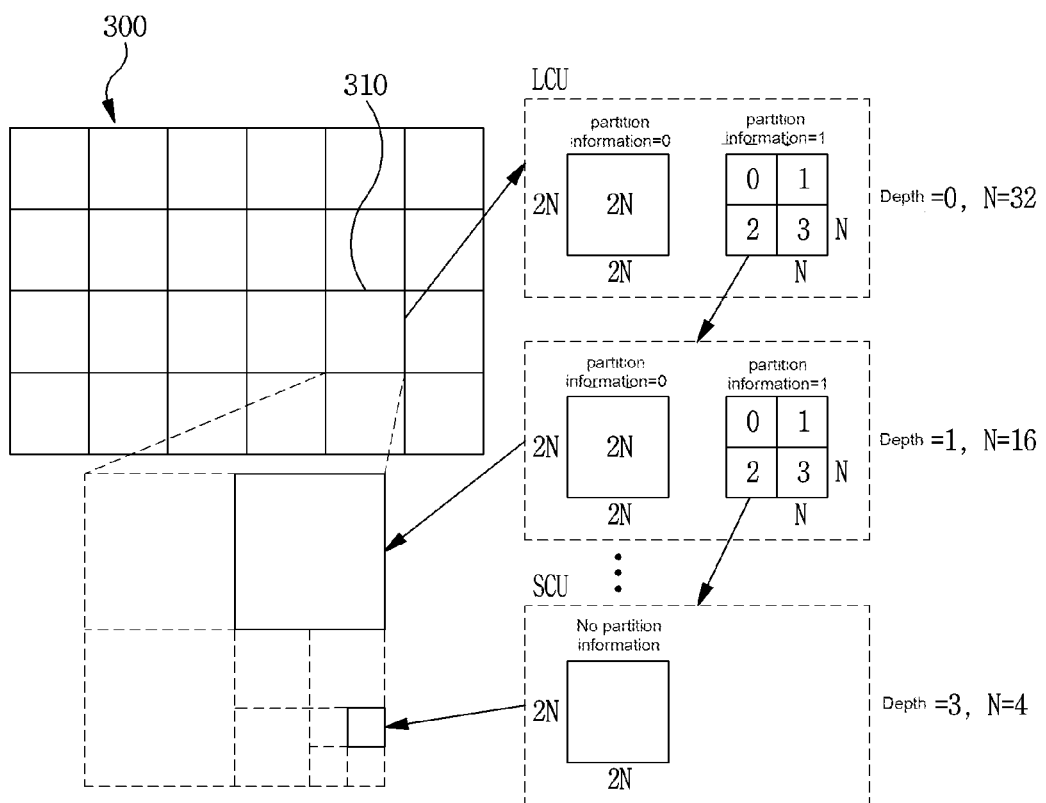
FIG. 3 is a view schematically showing a partition structure of an image when encoding and decoding the image.

FIG. 3 is a view schematically showing a partition structure of an image when encoding and decoding the image. FIG. 3 schematically shows an embodiment of partitioning one unit into a plurality of sub-units.

In order to efficiently partition an image, a coding unit (CU) may be used in encoding and decoding. Here, the coding unit may mean an encoding unit. The unit may be a combination of 1) a syntax element and 2) a block including image samples. For example, "partition of a unit" may mean "partition of a block relative to a unit". The block partition information may include information about the unit depth. Depth information may indicate the number of times a unit is partitioned or a partitioned degree of a unit or both.

Referring to FIG. 3, an image 300 is sequentially partitioned for each largest coding unit (LCU), and a partition structure is determined for each LCU. Here, the LCU and a coding tree unit (CTU) have the same meaning. One unit may have depth information based on a tree structure, and may be hierarchically partitioned. Each of the partitioned sub-units may have depth information. The depth information indicates the number of times a unit is partitioned or a partitioned degree of a unit or both, and thus, the depth information may include information about the size of the sub-unit.

The partition structure may mean distribution of a coding unit (CU) in the LCU 310. The CU may be a unit for efficiently encoding an image. The distribution may be determined on the basis of whether or not one CU will be partitioned in plural (a positive integer equal to or more than 2 including 2, 4, 8, 16, etc.). The width size and the height size of the partitioned CU may respectively be a half width size and a half height size of the original CU. Alternatively, according to the number of partitionings, the width size and the height size of the partitioned CU may respectively be smaller than the width size and the height size of the original CU. The partitioned CU may be recursively partitioned into a plurality of further partitioned CUs, wherein the further partitioned CU has a width size and a height size smaller than those of the partitioned CU in the same partition method.

Here, the partition of a CU may be recursively performed up to a predetermined depth. Depth information may be information indicating a size of the CU, and may be stored in each CU. For example, the depth of the LCU may be 0, and the depth of a smallest coding unit (SCU) may be a predetermined maximum depth. Here, the LCU may be a coding unit having a maximum size as described above, and the SCU may be a coding unit having a minimum size.

Whenever the LCU 310 begins to be partitioned, and the width size and the height size of the CU are decreased by the partitioning, the depth of a CU is increased by 1. In a case of a CU which cannot be partitioned, the CU may have a 2N×2N size for each depth. In a case of a CU that can be partitioned, the CU having a 2N×2N size may be partitioned into a plurality of N×N-size CUs. The size of N is reduced by half whenever the depth is increased by 1.

For example, when one coding unit is partitioned into four sub-coding units, a width size and a height size of one of the four sub-coding units may respectively be a half width size and a half height size of the original coding unit. For example, when a 32×32-size coding unit is partitioned into four sub-coding units, each of the four sub-coding units may have a 16×16 size. When one coding unit is partitioned into four sub-coding units, the coding unit may be partitioned in a quad-tree form.

For example, when one coding unit is partitioned into two sub-coding units, a width size or a height size of one of the two sub-coding units may respectively be a half width size or a half height size of the original coding unit. For example, when a 32×32-size coding unit is vertically partitioned into two sub-coding units, each of the two sub-coding units may have a 16×32 size. For example, when a 32×32-size coding unit is horizontally partitioned into two sub-coding units, each of the two sub-coding units may have a 32×16 size. When one coding unit is partitioned into two sub-coding units, the coding unit may be partitioned in a binary-tree form.

Referring to FIG. 3, the size of the LCU having a minimum depth of 0 may be 64×64 pixels, and the size of the SCU having a maximum depth of 3 may be 8×8 pixels. Here, a CU having 64×64 pixels, which is the LCU, may be denoted by a depth of 0, a CU having 32×32 pixels may be denoted by a depth of 1, a CU having 16×16 pixels may be denoted by a depth of 2, and a CU having 8×8 pixels, which is the SCU, may be denoted by a depth of 3.

In addition, information about whether or not a CU will be partitioned may be represented through partition information of a CU. The partition information may be 1 bit information. The partition information may be included in all CUs other than the SCU. For example, when a value of the partition information is 0, a CU may not be partitioned, and when a value of the partition information is 1, a CU may be partitioned.

Figure 4:
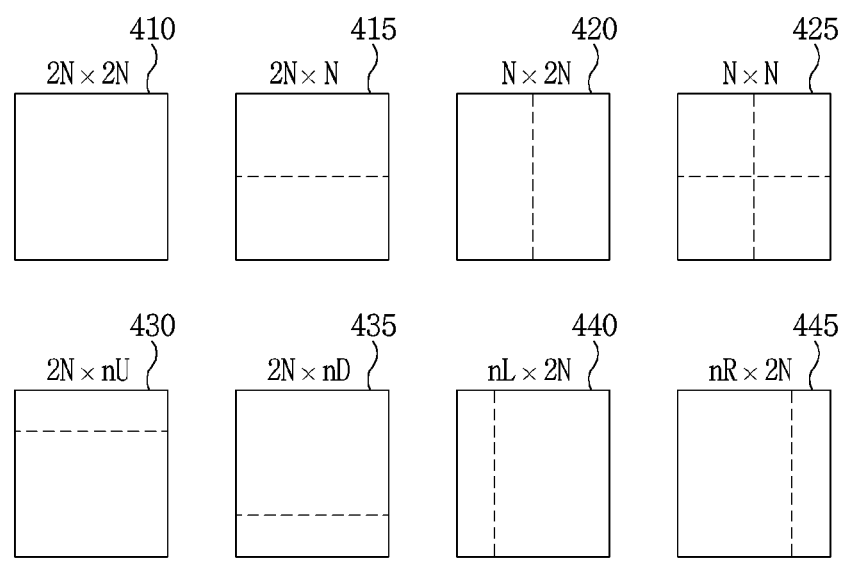
FIG. 4 is a view showing forms of a prediction unit (PU) that may be included in a coding unit (CU).

FIG. 4 is a view showing forms of a prediction unit (PU) that may be included in a coding unit (CU).

A CU that is no longer partitioned, from among CUs partitioned from the LCU, may be partitioned into at least one prediction unit (PU). This process may be also referred to as a partition.

The PU may be a basic unit for prediction. The PU may be encoded and decoded in any one of a skip mode, an inter mode, and an intra mode. The PU may be partitioned in various forms depending on the modes.

In addition, the coding unit may not be partitioned into a plurality of prediction units, and the coding unit and the prediction unit have the same size.

As shown in FIG. 4, in the skip mode, the CU may not be partitioned. In the skip mode, a 2N×2N mode 410 having the same size as a CU without partition may be supported.

In the inter mode, 8 partitioned forms may be supported within a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported. In the intra mode, the 2N×2N mode 410 and the N×N mode 425 may be supported.

One coding unit may be partitioned into one or more prediction units. One prediction unit may be partitioned into one or more sub-prediction units.

For example, when one prediction unit is partitioned into four sub-prediction units, a width size and a height size of one of the four sub-prediction units may be a half width size and a half height size of the original prediction unit. For example, when a 32×32-size prediction unit is partitioned into four sub-prediction units, each of the four sub-prediction units may have a 16×16 size. When one prediction unit is partitioned into four sub-prediction units, the prediction unit may be partitioned in the quad-tree form.

For example, when one prediction unit is partitioned into two sub-prediction units, a width size or a height size of one of the two sub-prediction units may be a half width size or a half height size of the original prediction unit. For example, when a 32×32-size prediction unit is vertically partitioned into two sub-prediction units, each of the two sub-prediction units may have a 16×32 size. For example, when a 32×32-size prediction unit is horizontally partitioned into two sub-prediction units, each of the two sub-prediction units may have a 32×16 size. When one prediction unit is partitioned into two sub-prediction units, the prediction unit may be partitioned in the binary-tree form.

Figure 5:
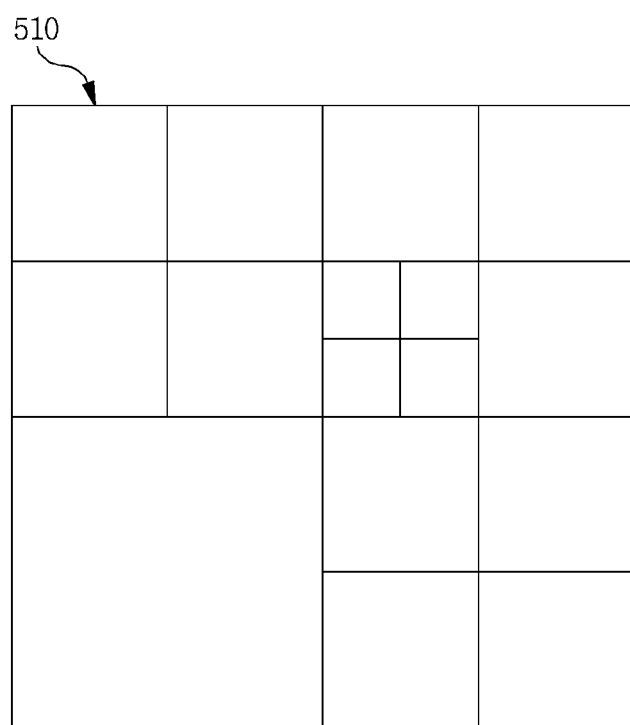
FIG. 5 is a view showing forms of a transform unit (TU) that may be included in a coding unit (CU).

FIG. 5 is a view showing forms of a transform unit (TU) that may be included in a coding unit (CU).

A transform unit (TU) may be a basic unit used for a transform, quantization, a reverse transform, and dequantization within a CU. The TU may have a square shape or a rectangular shape, etc. The TU may be dependently determined by a size of a CU or a form of a CU or both.

A CU that is no longer partitioned among CUs partitioned from the LCU may be partitioned into at least one TU. Here, the partition structure of the TU may be a quad-tree structure. For example, as shown in FIG. 5, one CU 510 may be partitioned once or more depending on the quad-tree structure. The case where one CU is partitioned at least once may be referred to as recursive partition. Through the partitioning, one CU 510 may be formed of TUs having various sizes. Alternatively, a CU may be partitioned into at least one TU depending on the number of vertical lines partitioning the CU or the number of horizontal lines partitioning the CU or both. The CU may be partitioned into TUs that are symmetrical to each other, or may be partitioned into TUs that are asymmetrical to each other. In order to partition the CU into TUs that are symmetrical to each other, information of a size/shape of the TU may be signaled, and may be derived from information of a size/shape of the CU.

In addition, the coding unit may not be partitioned into transform units, and the coding unit and the transform unit may have the same size.

One coding unit may be partitioned into at least one transform unit, and one transform unit may be partitioned into at least one sub-transform unit.

For example, when one transform unit is partitioned into four sub-transform units, a width size and a height size of one of the four sub-transform units may respectively be a half width size and a half height size of the original transform unit. For example, when a 32×32-size transform unit is partitioned into four sub-transform units, each of the four sub-transform units may have a 16×16 size. When one transform unit is partitioned into four sub-transform units, the transform unit may be partitioned in the quad-tree form.

For example, when one transform unit is partitioned into two sub-transform units, a width size or a height size of one of the two sub-transform units may respectively be a half width size or a half height size of the original transform unit. For example, when a 32×32-size transform unit is vertically partitioned into two sub-transform units, each of the two sub-transform units may have a 16×32 size. For example, when a 32×32-size transform unit is horizontally partitioned into two sub-transform units, each of the two sub-transform units may have a 32×16 size. When one transform unit is partitioned into two sub-transform units, the transform unit may be partitioned in the binary-tree form.

When performing transform, the residual block may be transformed by using at least one of predetermined transform methods. For example, the predetermined transform methods may include discrete cosine transform (DCT), discrete sine transform (DST), KLT, etc. Which transform method is applied to transform the residual block may be determined by using at least one of inter-prediction mode information of the prediction unit, intra-prediction mode information of the prediction unit, and size/shape of the transform block. Information indicating the transform method may be signaled.

Figure 6:
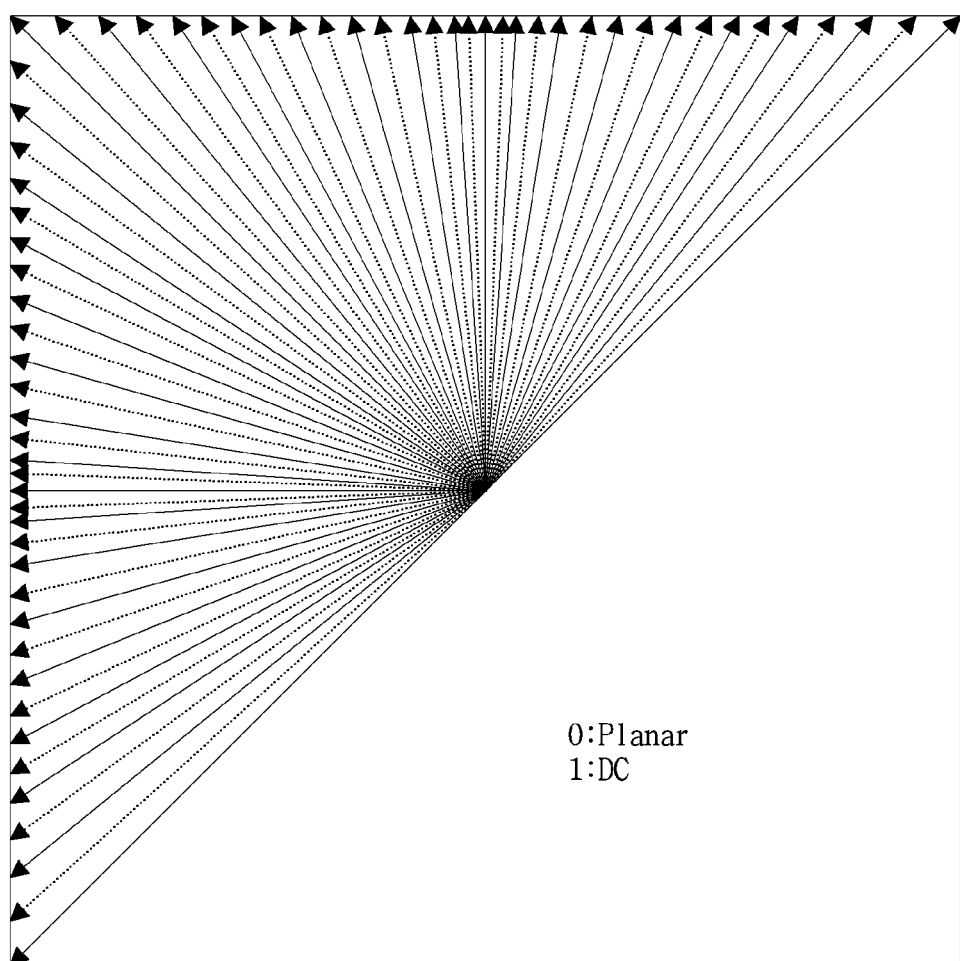
FIG. 6 is a view for explaining an embodiment of a process of intra prediction.

FIG. 6 is a view for explaining an embodiment of a process of intra prediction.

The intra-prediction mode may be a non-directional mode or a directional mode. The non-directional mode may be a DC mode or a planar mode. The directional mode may be a prediction mode having a particular direction or angle, and the number of directional modes may be M which is equal to or greater than one. The directional mode may be indicated as at least one of a mode number, a mode value, and a mode angle.

The number of intra-prediction modes may be N which is equal to or greater than one, including the non-directional and directional modes.

The number of intra-prediction modes may vary depending on the size of a block. For example, when the size is 4×4 or 8×8, the number may be 67, and when the size is 16×16, the number may be 35, and when the size is 32×32, the number may be 19, and when the size is 64×64, the number may be 7.

The number of intra-prediction modes may be fixed to N regardless of the size of a block. For example, the number may be fixed to at least one of 35 or 67 regardless of the size of a block.

The number of intra-prediction modes may vary depending on a type of a color component. For example, the number of prediction modes may vary depending on whether a color component is a luma signal or a chroma signal.

Intra encoding and/or decoding may be performed by using a sample value or an encoding parameter included in a reconstructed neighboring block.

For encoding/decoding a current block in intra prediction, whether or not samples included in a reconstructed neighboring block are available as reference samples of an encoding/decoding target block may be identified. When there are samples that cannot be used as reference samples of the encoding/decoding target block, sample values are copied and/or interpolated into the samples that cannot be used as the reference samples by using at least one of samples included in the reconstructed neighboring block, whereby the samples that cannot be used as reference samples can be used as the reference samples of the encoding/decoding target block.

In intra prediction, based on at least one of an intra-prediction mode and the size of the encoding/decoding target block, a filter may be applied to at least one of a reference sample or a prediction sample. Here, the encoding/decoding target block may mean a current block, and may mean at least one of a coding block, a prediction block, and a transform block. A type of a filter being applied to a reference sample or a prediction sample may vary depending on at least one of the intra-prediction mode or size/shape of the current block. The type of the filter may vary depending on at least one of the number of filter taps, a filter coefficient value, or filter strength.

In a non-directional planar mode among intra-prediction modes, when generating a prediction block of the encoding/decoding target block, a sample value in the prediction block may be generated by using a weighted sum of an upper reference sample of the current sample, a left reference sample of the current sample, an upper right reference sample of the current block, and a lower left reference sample of the current block according to the sample location.

In a non-directional DC mode among intra-prediction modes, when generating a prediction block of the encoding/decoding target block, it may be generated by an average value of upper reference samples of the current block and left reference samples of the current block. In addition, filtering may be performed on one or more upper rows and one or more left columns adjacent to the reference sample in the encoding/decoding block by using reference sample values.

In a case of multiple directional modes (angular mode) among intra-prediction modes, a prediction block may be generated by using the upper right and/or lower left reference sample, and the directional modes may have different direction. In order to generate a prediction sample value, interpolation of a real number unit may be performed.

In order to perform an intra-prediction method, an intra-prediction mode of a current prediction block may be predicted from an intra-prediction mode of a neighboring prediction block that is adjacent to the current prediction block. In a case of prediction the intra-prediction mode of the current prediction block by using mode information predicted from the neighboring intra-prediction mode, when the current prediction block and the neighboring prediction block have the same intra-prediction mode, information that the current prediction block and the neighboring prediction block have the same intra-prediction mode may be transmitted by using predetermined flag information. When the intra-prediction mode of the current prediction block is different from the intra-prediction mode of the neighboring prediction block, intra-prediction mode information of the encoding/decoding target block may be encoded by performing entropy encoding.

FIG. 7 is a view for explaining an embodiment of a process of inter prediction.

The quadrangular shapes shown in FIG. 7 may indicate images (or, pictures). Also, the arrows of FIG. 7 may indicate prediction directions. That is, images may be encoded or decoded or both according to prediction directions. Each image may be classified into an I-picture (intra picture), a P-picture (uni-predictive picture), a B-picture (bi-predictive picture), etc. according to encoding types. Each picture may be encoded and decoded depending on an encoding type of each picture.

When an image, which is an encoding target, is an I-picture, the image itself may be intra encoded without inter prediction. When an image, which is an encoding target, is a P-picture, the image may be encoded by inter prediction or motion compensation using a reference picture only in a forward direction. When an image, which is an encoding target, is a B-picture, the image may be encoded by inter prediction or motion compensation using reference pictures in both a forward direction and a reverse direction. Alternatively, the image may be encoded by inter prediction or motion compensation using a reference picture in one of a forward direction and a reverse direction. Here, when an inter-prediction mode is used, the encoder may perform inter prediction or motion compensation, and the decoder may perform motion compensation in response to the encoder. Images of the P-picture and the B-picture that are encoded or decoded or both by using a reference picture may be regarded as an image for inter prediction.

Hereinafter, inter prediction according to an embodiment will be described in detail.

Inter prediction or motion compensation may be performed by using both a reference picture and motion information. In addition, inter prediction may use the above described skip mode.

The reference picture may be at least one of a previous picture and a subsequent picture of a current picture. Here, inter prediction may predict a block of the current picture depending on the reference picture. Here, the reference picture may mean an image used in predicting a block. Here, an area within the reference picture may be specified by using a reference picture index (refIdx) indicating a reference picture, a motion vector, etc.

Inter prediction may select a reference picture and a reference block relative to a current block within the reference picture. A prediction block of the current block may be generated by using the selected reference block. The current block may be a block that is a current encoding or decoding target among blocks of the current picture.

Motion information may be derived from a process of inter prediction by the encoding apparatus 100 and the decoding apparatus 200. In addition, the derived motion information may be used in performing inter prediction. Here, the encoding apparatus 100 and the decoding apparatus 200 may enhance encoding efficiency or decoding efficiency or both by using motion information of a reconstructed neighboring block or motion information of a collocated block (col block) or both. The col block may be a block relative to a spatial position of the encoding/decoding target block within a collocated picture (col picture) that is previously reconstructed. The reconstructed neighboring block may be a block within a current picture, and a block that is previously reconstructed through encoding or decoding or both. In addition, the reconstructed block may be a block adjacent to the encoding/decoding target block or a block positioned at an outer corner of the encoding/decoding target block or both. Here, the block positioned at the outer corner of the encoding/decoding target block may be a block that is vertically adjacent to a neighboring block horizontally adjacent to the encoding/decoding target block. Alternatively, the block positioned at the outer corner of the encoding/decoding target block may be a block that is horizontally adjacent to a neighboring block vertically adjacent to the encoding/decoding target block.

The encoding apparatus 100 and the decoding apparatus 200 may respectively determine a block that exists at a position spatially relative to the encoding/decoding target block within the col picture, and may determine a predefined relative position on the basis of the determined block. The predefined relative position may be an inner position or an outer position or both of a block that exists at a position spatially relative to the encoding/decoding target block. In addition, the encoding apparatus 100 and the decoding apparatus 200 may respectively derive the col block on the basis of the determined predefined relative position. Here, the col picture may be one picture of at least one reference picture included in the reference picture list.

A method of deriving the motion information may vary according to a prediction mode of the encoding/decoding target block. For example, a prediction mode being applied for inter prediction may include an advanced motion vector prediction (AMVP), a merge mode, etc. Here, the merge mode may be referred to as a motion merge mode.

For example, when AMVP is applied as the prediction mode, the encoding apparatus 100 and the decoding apparatus 200 may respectively generate a motion vector candidate list by using a motion vector of the reconstructed neighboring block or a motion vector of the col block or both. The motion vector of the reconstructed neighboring block or the motion vector of the col block or both may be used as motion vector candidates. Here, the motion vector of the col block may be referred to as a temporal motion vector candidate, and the motion vector of the reconstructed neighboring block may be referred to as a spatial motion vector candidate.

The encoding apparatus 100 may generate a bitstream, and the bitstream may include a motion vector candidate index. That is, the encoding apparatus 100 may generate a bitstream by entropy encoding the motion vector candidate index. The motion vector candidate index may indicate an optimum motion vector candidate that is selected from motion vector candidates included in the motion vector candidate list. The motion vector candidate index may be transmitted from the encoding apparatus 100 to the decoding apparatus 200 through the bitstream.

The decoding apparatus 200 may entropy decode the motion vector candidate index from the bitstream, and may select a motion vector candidate of a decoding target block among the motion vector candidates included in the motion vector candidate list by using the entropy decoded motion vector candidate index.

The encoding apparatus 100 may calculate a motion vector difference (MVD) between the motion vector and the motion vector candidate of the decoding target block, and may entropy encode the MVD. The bitstream may include the entropy encoded MVD. The MVD may be transmitted from the encoding apparatus 100 to the decoding apparatus 200 through the bitstream. Here, the decoding apparatus 200 may entropy decode the received MVD from the bitstream. The decoding apparatus 200 may derive a motion vector of the decoding target block through a sum of the decoded MVD and the motion vector candidate.

The bitstream may include a reference picture index indicating a reference picture, etc., and a reference picture index may be entropy encoded and transmitted from the encoding apparatus 100 to the decoding apparatus 200 through the bitstream. The decoding apparatus 200 may predict a motion vector of the decoding target block by using motion information of neighboring blocks, and may derive the motion vector of the decoding target block by using the predicted motion vector and the motion vector difference.

The decoding apparatus 200 may generate the prediction block of the decoding target block on the basis of the derived motion vector and reference picture index information.

As another method of deriving the motion information, a merge mode is used. The merge mode may mean a merger of motions of a plurality of blocks. The merge mode may mean application of motion information of one block to another block. When the merge mode is applied, the encoding apparatus 100 and the decoding apparatus 200 may respectively generate a merge candidate list by using motion information of the reconstructed neighboring block or motion information of the col block or both. The motion information may include at least one of 1) the motion vector, 2) the reference picture index, and 3) the inter-prediction indicator. A prediction indicator may indicate a uni-direction (L0 prediction, L1 prediction) or a bi-direction.

Here, the merge mode may be applied to each CU or each PU. When the merge mode is performed at each CU or each PU, the encoding apparatus 100 may generate a bitstream by entropy decoding predefined information, and may transmit the bitstream to the decoding apparatus 200. The bitstream may include the predefined information. The predefined information may include: 1) a merge flag that is information indicating whether or not the merge mode is performed for each block partition; and 2) a merge index that is information to which a block among the neighboring blocks adjacent to the encoding target block is merged. For example, neighboring blocks adjacent to the encoding target block may include a left neighboring block of the encoding target block, an upper neighboring block of the encoding target block, a temporally neighboring block of the encoding target block, etc.

The merge candidate list may indicate a list storing motion information. In addition, the merge candidate list may be generated in advance of performing the merge mode. The motion information stored in the merge candidate list may be at least one of motion information of the neighboring block adjacent to the encoding/decoding target block, motion information of the collocated block relative to the encoding/decoding target block in the reference picture, motion information newly generated by a combination of motion information that exists in the merge motion candidate list in advance, and a zero merge candidate. Here, motion information of the neighboring block adjacent to the encoding/decoding target block may be referred to as a spatial merge candidate. Motion information of the collocated block relative to the encoding/decoding target block in the reference picture may be referred to as a temporal merge candidate.

A skip mode may be a mode applying the mode information of the neighboring block itself to the encoding/decoding target block. The skip mode may be one of modes used for inter prediction. When the skip mode is used, the encoding apparatus 100 may entropy encode information about motion information of which block is used as motion information of the encoding target block, and may transmit the information to the decoding apparatus 200 through a bitstream. The encoding apparatus 100 may not transmit other information, for example, syntax element information, to the decoding apparatus 200. The syntax element information may include at least one of motion vector difference information, a coded block flag, and a transform coefficient level.

A residual signal generated after intra or inter prediction may be transformed into a frequency domain through a transform process as a part of a quantization process. Here, a primary transform may use DCT type 2 (DCI-II) as well as various DCT, DST kernels. On a residual signal, these transform kernels may perform a separable transform performing a 1D transform in a horizontal and/or vertical direction, or may perform a 2D non-separable transform.

For example, DCT and DST types used in transform may use DCT-II, DCT-V, DCT-VIII, DST-I, and DST-VII as shown in following tables in a case of the 1D transform. For example, as shown in the table 1 and table 2, a DCT or DST type used in transform by composing a transform set may be derived.

TABLE 1

| Transform set | Transform |
| --- | --- |
| 0 | DST_VII, DCT-VIII |
| 1 | DST-VII, DST-I |
| 2 | DST-VII, DCT-V |

TABLE 2

| Transform set | Transform |
| --- | --- |
| 0 | DST_VII, DCT-VIII, DST-I |
| 1 | DST-VII, DST-I, DCT-VIII |
| 2 | DST-VII, DCT-V, DST-I |

For example, as shown in FIG. 8, according to an intra-prediction mode, different transform sets are defined for horizontal and vertical directions. Next, the encoder/decoder may perform transform and/or inverse transform by using an intra-prediction mode of a current encoding/decoding target block and transform of a relevant transform set. In this case, entropy encoding/decoding is not performed on the transform set, and the encoder/decoder may define the transform set according to the same rule. In this case, entropy encoding/decoding indicating which transform is used among transforms of the transform set may be performed. For example, when the size of a block is equal to or less than 64×64, three transform sets are composed as shown in table 2 according to an intra-prediction mode, and three transforms are used for each horizontal direction transform and vertical direction transform to combine and perform total nine multi-transform methods. Next, a residual signal is encoded/decoded by using the optimum transform method, whereby encoding efficiency can be enhanced. Here, in order to perform entropy encoding/decoding on information about which transform method is used among three transforms of one transform set, truncated unary binarization may be used. Here, for at least one of vertical transform and horizontal transform, entropy encoding/decoding may be performed on the information indicating which transform is used among transforms of a transform set.

Figure 9:
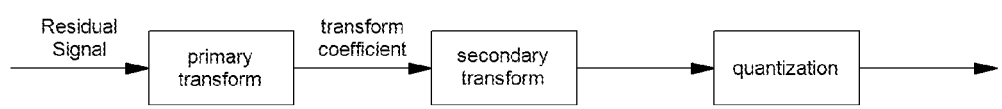
FIG. 9 is a view for explaining a process of transform.

After completing the above-described primary transform, the encoder may perform a secondary transform to increase energy concentration for transformed coefficients as shown in FIG. 9. The secondary transform may perform a separable transform performing a 1D transform in a horizontal and/or vertical direction, or may perform a 2D non-separable transform. Used transform information may be transmitted or may be derived by the encoder/decoder according to current and neighboring encoding information. For example, like the 1D transform, a transform set for the secondary transform may be defined. Entropy encoding/decoding is not performed on the transform set, and the encoder/decoder may define the transform set according to the same rule. In this case, information indicating which transform is used among transforms of the transform set may be transmitted, and the information may be applied to at least one residual signal through intra or inter prediction.

At least one of the number or types of transform candidates is different for each transform set. At least one of the number or types of transform candidates may be variably determined based on at least one of the location, the size, the partition form, and the prediction mode (intra/inter mode) or direction/non-direction of the intra-prediction mode of a block (CU, PU, TU, etc.).

The decoder may perform a secondary inverse transform depending on whether or not the secondary inverse transform is performed, and may perform a primary inverse transform depending on whether or not the primary inverse transform is performed from the result of the secondary inverse transform.

The above-described primary transform and secondary transform may be applied to at least one signal component of luma/chroma components or may be applied according to the size/shape of an arbitrary coding block. Entropy encoding/decoding may be performed on an index indicating both whether or not the primary transform/secondary transform is used and the used primary transform/secondary transform in an arbitrary coding block. Alternatively, the index may be tacitly derived by the encoder/decoder according to at least one piece of current/neighboring encoding information.

The residual signal generated after intra or inter prediction goes through a quantization process after the primary and/or secondary transform, and quantized transform coefficients go through an entropy encoding process. Here, the quantized transform coefficients may be scanned in diagonal, vertical, and horizontal directions based on at least one of the intra-prediction mode or the size/shape of a minimum block as shown in FIG. 10.

In addition, the quantized transform coefficients on which entropy decoding is performed may be arranged in block forms by being inverse scanned, and at least one of dequantization or inverse transform may be performed on the relevant block. Here, as a method of inverse scanning, at least one of diagonal direction scanning, horizontal direction scanning, and vertical direction scanning may be performed.

Figure 10:
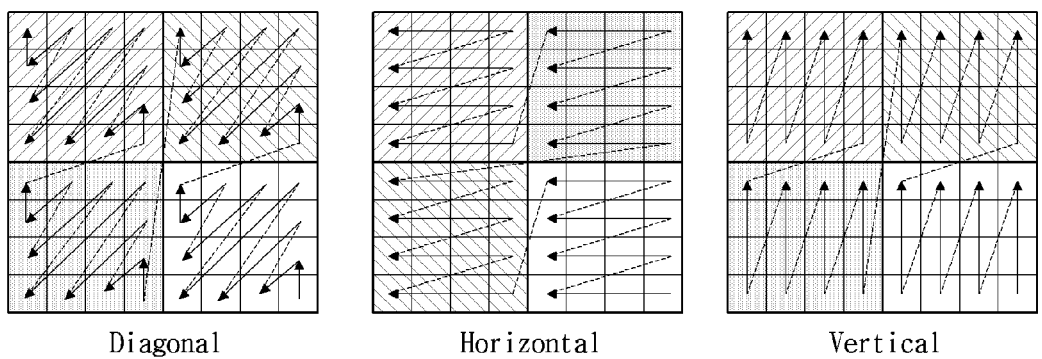
FIG. 10 is a view for explaining scanning of quantized transform coefficients.

For example, when the size of a current coding block is 8×8, primary transform, secondary transform, and quantization may be performed on a residual signal for the 8×8 block, and next, scanning and entropy encoding may be performed on quantized transform coefficients for each of four 4×4 sub-blocks according to at least one of three scanning order methods shown in FIG. 10. In addition, inverse scanning may be performed on the quantized transform coefficients by performing entropy decoding. The quantized transform coefficients on which inverse scanning is performed become transform coefficients after dequantization, and at least one of secondary inverse transform or primary inverse transform is performed, whereby a reconstructed residual signal can be generated.

Figure 11:
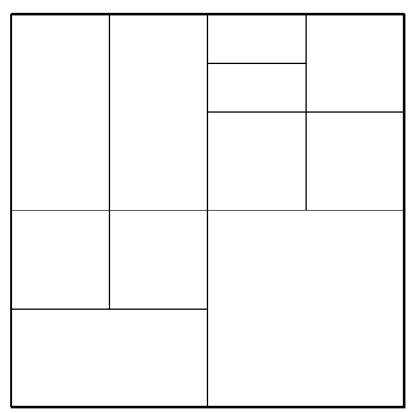
FIG. 11 is a view for explaining block partition.

In a video encoding process, one block may be partitioned as shown in FIG. 11, and an indicator corresponding to partition information may be signaled. Here, the partition information may be at least one of a partition flag (split_flag), a quad/binary tree flag (QB_flag), a quad tree partition flag (quadtree_flag), a binary tree partition flag (binarytree_flag), and a binary tree partition type flag (Btype_flag). Here, split_flag is a flag indicating whether or not a block is partitioned, QB_flag is a flag indicating whether a block is partitioned in a quad tree form or in a binary tree form, quadtree_flag is a flag indicating whether or not a block is partitioned in a quad tree form, binarytree_flag is a flag indicating whether or not a block is partitioned in a binary tree form, Btype_flag is a flag indicating whether a block is vertically or horizontally partitioned in a case of partition of a binary tree form.

When the partition flag is 1, it may indicate partitioning is performed, and when the partition flag is 0, it may indicate partitioning is not performed. In a case of the quad/binary tree flag, 0 may indicate a quad tree partition, and 1 may indicate a binary tree partition. Alternatively, 0 may indicate a binary tree partition, and 1 may indicate a quad tree partition. In a case of the binary tree partition type flag, 0 may indicate a horizontal direction partition, and 1 may indicate a vertical direction partition. Alternatively, 0 may indicate a vertical direction partition, and 1 may indicate a horizontal direction partition.

For example, partition information for FIG. 11 may be derived by signaling at least one of quadtree_flag, binarytree_flag, and Btype_flag as shown in table 3.

TABLE 3

| quadtree_flag | 1 | 0 | | | 1 | 0 | | | 0 | 0 | 0 | 0 | | | | | 0 |
|---|---|---|---|---|---|---|---|---|---|---|---|---|---|---|---|---|---|
| binarytree_flag | | | 1 | 0 | 0 | | 1 | 0 | 0 | 0 | 0 | 0 | 1 | 1 | 0 | 0 | 0 | 0 |
| Btype_flag | | | | 1 | | | | 0 | | | | | | | 0 | 1 | | |

For example, partition information for FIG. 11 may be derived by signaling at least one of split_flag, QB_flag, and Btype_flag as shown in table 2.

TABLE 4

| split_flag | 1 | 1 | | | 0 | 0 | 1 | | 1 | | 0 | 0 | 0 | 0 | 0 | 1 | | 1 | | 0 | 0 | 0 | 0 |
|---|---|---|---|---|---|---|---|---|---|---|---|---|---|---|---|---|---|---|---|---|---|---|---|
| QB_flag | | | 0 | 1 | | | | 0 | 1 | | | | | | | | 1 | | | | | | |
| Btype_flag | | | | 1 | | | | | | 0 | | | | | | | | | 0 | 1 | | | |

The partition method may be performed only in a quad tree form or only in a binary tree form according to the size/shape of a block. In this case, the split_flag may mean a flag indicating whether partitioning is performed in a quad tree for or in a binary tree form. The size/shape of a block may be derived according to depth information of a block, and the depth information may be signaled.

When the size of a block is in a predetermined range, partitioning may be performed only in a quad tree form. Here, the predetermined range may be defined as at least one of the size of a maximum block or the size of a minimum block that can be partitioned only in a quad tree form. Information indicating the size of a maximum/minimum block where a partition in the quad tree form is allowed may be signaled through a bitstream, and the information may be signaled by a unit of at least one of a sequence, a picture parameter, or a slice (segment). Alternatively, the size of a maximum/minimum block may be a fixed size that is preset in the encoder/decoder. For example, when the size of a block ranges 256×256 to 64×64, partitioning may be performed only in a quad tree form. In this case, the split_flag may be a flag indicating whether partitioning is performed in a quad tree form.

When the size of a block is in a predetermined range, partitioning may be performed only in a binary tree form. Here, the predetermined range may be defined as at least one of the size of a maximum block or the size of a minimum block that can be partitioned only in a binary tree form. Information indicating the size of a maximum/minimum block where a partition in the binary tree form is allowed may be signaled through a bitstream, and the information may be signaled by a unit of at least one of a sequence, a picture parameter, or a slice (segment). Alternatively, the size of a maximum/minimum block may be a fixed size that is preset in the encoder/decoder. For example, when the size of a block ranges 16×16 to 8×8, partitioning may be performed only in a binary tree form. In this case, the split_flag may be a flag indicating whether partitioning is performed in a binary tree form.

After partitioning one block in a binary tree form, when the partitioned block is further partitioned, partitioning may be performed only in a binary tree form.

When the width or length size of the partitioned block cannot be further partitioned, at least one indicator may not be signaled.

Besides the quad tree based binary tree partitioning, the quad tree based partitioning may be performed after the binary tree partitioning.

Based on the above description, a method of encoding/decoding an image by using a motion vector according to the present invention will be disclosed in detail.

Figure 12:
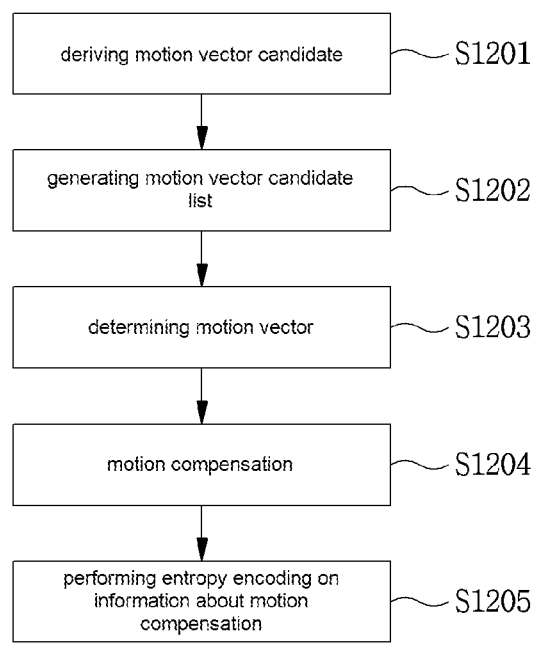
FIG. 12 is a flowchart illustrating a method of encoding an image according to the present invention.
Figure 13:
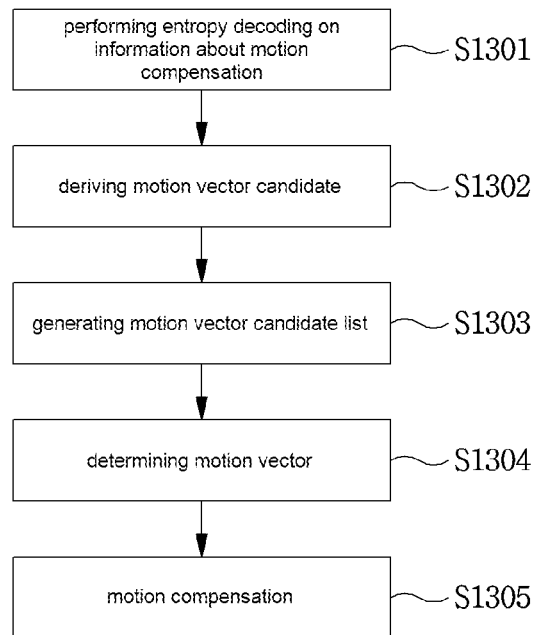
FIG. 13 is a flowchart illustrating a method of decoding an image according to the present invention.

FIG. 12 is a flowchart illustrating a method of encoding an image according to the present invention. FIG. 13 is a flowchart illustrating a method of decoding an image according to the present invention.

Referring to FIG. 12, the encoding apparatus may derive motion vector candidates at step S1201, and may generate a motion vector candidate list based on the derived motion vector candidates at step S1202. When the motion vector candidate list is generated, motion vectors may be determined by using the generated motion vector candidate list at step S1203. Motion compensation may be performed by using the motion vectors at step S1204. Next, the encoding apparatus may perform entropy encoding on information about the motion compensation at step S1205.

Referring to FIG. 13, the decoding apparatus may perform entropy decoding on the information about the motion compensation received from the encoding apparatus at step S1301, and may derive the motion vector candidates at step S1302. In addition, the decoding apparatus may generate the motion vector candidate list based on the derived motion vector candidates at step S1303, and may determine the motion vectors by using the generated motion vector candidate list at step S1304. Next, the decoding apparatus may perform motion compensation by using the motion vectors at step S1305.

Hereinafter, the steps shown in FIGS. 12 and 13 will be disclosed in detail.

First, the deriving of the motion vector candidates S1201 and S1302 will be disclosed in detail.

Motion vector candidates for a current block may include at least one of a spatial motion vector candidate or a temporal motion vector candidate.

The spatial motion vector of the current block may be derived from a reconstructed block adjacent to the current block. For example, a motion vector of the reconstructed block adjacent to the current block may be determined as a spatial motion vector candidate for the current block.

Figure 14:
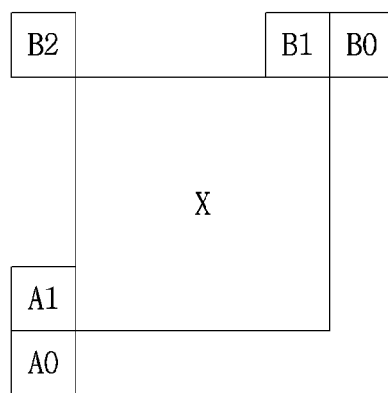
FIG. 14 is a view for explaining an example of deriving spatial motion vector candidates of a current block.

FIG. 14 is a view for explaining an example of deriving spatial motion vector candidates of a current block.

Referring to FIG. 14, spatial motion vector candidates of the current block may be derived from neighboring blocks adjacent to a current block X. Here, the neighboring blocks adjacent to the current block may include at least one of a block B1 adjacent to the top of the current block, a block A1 adjacent to the left of the current block, a block B0 adjacent to the upper right corner of the current block, a block B2 adjacent to the upper left corner of the current block, and a block A0 adjacent to the lower left corner of the current block.

When a motion vector exists at a neighboring block adjacent to a current block, the motion vector of the neighboring block may be determined as a spatial motion vector candidate of the current block. Whether or not a motion vector of a neighboring block exists or whether or not a motion vector of a neighboring block is available as a spatial motion vector candidate of a current block may be determined based on whether or not a neighboring block exists, or whether or not a neighboring block is encoded through inter prediction, etc. Here, whether or not the motion vector of the neighboring block exists or whether or not the motion vector of the neighboring block is available as the spatial motion vector candidate of the current block may be determined according to predetermined priorities. For example, in FIG. 14, availability of motion vectors may be determined in order of blocks at the locations A0, A1, B0, B1, and B2.

When a reference block of a current block is different from a reference image of a neighboring block having a motion vector, a scaled motion vector of the neighboring block may be determined as a spatial motion vector candidate of the current block. Here, scaling may be performed based on at least one of a distance between a current image and a reference image referenced by the current block and a distance between the current image and a reference image referenced by a neighboring block. For example, the motion vector of the neighboring block is scaled by a difference value of the distance between the current image and the reference image referenced by the current block and the distance between the current image and the reference image referenced by the neighboring block, whereby a spatial motion vector candidate of the current block can be derived.

Even through a reference picture list of the current block is different from a reference picture list of the neighboring block, whether or not the motion vector of the neighboring block is scaled may be determined based on whether or not a reference image of the current block is the same as a reference image of the neighboring block. Here, the reference picture list may include at least one of List0 (L0), List1 (L1), List2 (L2), List3 (L3), etc.

In summary, a spatial motion vector candidate may be derived based on at least one of availability of a neighboring block, whether or not a neighboring block is encoded in an intra-prediction mode, whether or not a neighboring block has the same reference picture list as that of the current block, or whether or not a neighboring block has the same reference image as that of the current block. When a neighboring block is available and is not encoded in an intra-prediction mode, a spatial motion vector candidate of the current block may be generated by a method illustrated in the following table 5.

TABLE 5

| Order | Whether current block and neighboring block have the same reference picture list | Whether current block and neighboring block have the same reference image | Spatial motion vector candidate of current block |
|---|---|---|---|
| 1 | Same | Same | Motion vector of neighboring block |
| 2 | Different | Same | Motion vector of neighboring block |
| 3 | Same | Different | Scaling motion vector of neighboring block |
| 4 | Different | Different | Scaling motion vector of neighboring block |

As shown in table 5, even through the reference picture list of the current block is different from the reference picture list of the neighboring block, when the current block and the neighboring block have the same reference image, the motion vector of the neighboring block may be determined as a spatial motion vector candidate of the current block.

In contrast, when the reference image of the current block is different from the reference image of the neighboring block, regardless of whether or not the reference picture list of the current block is the same as the reference picture list of the neighboring block, the motion vector of the neighboring block is scaled to be determined as a spatial motion vector candidate of the current block.

When deriving a spatial motion vector candidate of the current block from the neighboring block, a deriving order of the spatial motion vector candidate of the current block may be determined based on whether or not the current block and the neighboring block have the same reference image. For example, a spatial vector candidate may be preferentially derived from a neighboring block having the same reference image as that of the current block, and when the number of derived spatial motion vector candidates (or the number of derived motion vector candidates) is equal to or less than a preset maximum value, a spatial vector candidate may be derived from the neighboring block having a different image from that of the current block.

Alternatively, a spatial motion vector prediction candidate of the current block may be determined based on whether the current block and the neighboring block have the same reference image, and based on the location of the neighboring block.

For example, according to whether or not the reference images are the same, a spatial motion vector candidate of the current block may be derived from neighboring blocks A0 and A1 adjacent to the left of the current block, and next, according to whether or not the reference images are the same, a spatial motion vector candidate of the current block may be derived from neighboring blocks B0, B1, and B2 adjacent to the top of the current block. Table 6 shows deriving order of spatial motion vector candidates of the current block.

TABLE 6

| Order | Spatial motion vector candidate deriving target |
|---|---|
| 1 | When a current block and block A0 have the same reference image, a spatial motion vector candidate is derived from block A0 |

TABLE 6-continued

| Order | Spatial motion vector candidate deriving target |
|---|---|
| 2 | When a current block and block A1 have the same reference image, a spatial motion vector candidate is derived from block A1 |
| 3 | When a current block and block A0 have different reference images, a spatial motion vector candidate is derived from block A0 |
| 4 | When a current block and block A1 have different reference images, a spatial motion vector candidate is derived from block A0 |
| 5 | When a current block and block B0 have the same reference image, a spatial motion vector candidate is derived from block B0 |
| 6 | When a current block and block B1 have the same reference image, a spatial motion vector candidate is derived from block B1 |
| 7 | When a current block and block B2 have the same reference image, a spatial motion vector candidate is derived from block B2 |
| 8 | When a current block and block B0 have different reference images, a spatial motion vector candidate is derived from block B0 |
| 9 | When a current block and block B1 have different reference images, a spatial motion vector candidate is derived from block B1 |
| 10 | When a current block and block B2 have different reference images, a spatial motion vector candidate is derived from block B2 |

The maximum number of spatial motion vector candidates of the current block may be preset to have the same value in the encoding apparatus and the decoding apparatus. Alternatively, the encoding apparatus may encode information indicating the maximum number of spatial motion vector candidates of the current block, and may transmit the information to the decoding apparatus through a bitstream. For example, the encoding apparatus may encode 'maxNumSpatialMVPCand' indicating the maximum number of spatial motion vector candidates of the current block, and may transmits 'maxNumSpatialMVPCand' to the decoding apparatus through a bitstream. Here, 'maxNumSpatialMVPCand' may be set to a positive integer including zero. For example, 'maxNumSpatialMVPCand' may be set to two.

A temporal motion vector candidate of the current block may be derived from a reconstructed block included in a collocated picture of a current picture. Here, the collocated picture is a picture where encoding/decoding is completed before the current picture, and may be a picture having a temporal order different from that of the current picture.

Figure 15:
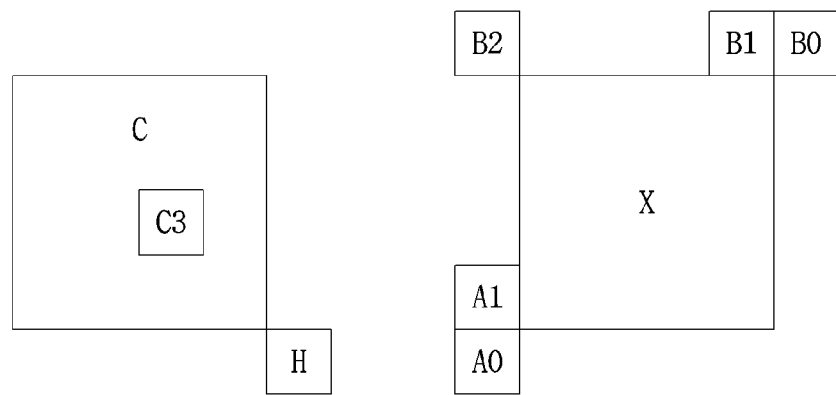
FIG. 15 is a view for explaining an example of deriving temporal motion vector candidates of a current block.

FIG. 15 is a view for explaining an example of deriving temporal motion vector candidates of a current block.

Referring to FIG. 15, in a collocated picture of a current picture, a temporal motion vector candidate of a current block may be derived from a block including an outer location of a block corresponding to spatially the same location as a current block X or from a block including an inner location of a block corresponding to spatially the same location as the current block X. For example, a temporal motion vector candidate of the current block X may be derived from a block H adjacent to the lower left corner of a block C corresponding to spatially the same location as the current block or from a block C3 including the central point of the block C. The block H or block C3, etc. used to derive a temporal motion vector candidate of a current block may be referred to as 'a collocated block'.

When a temporal motion vector candidate of the current block can be derived from a block H including an outer location of the block C, the block H may be set as a collocated block of the current block. In this case, a temporal motion vector of the current block may be derived based on a motion vector of the block H. In contrast, when the temporal motion vector candidate of the current block cannot be derived from the block H, the block C3 including an inner location of the block C may be set as a collocated block of the current block. In this case, a temporal motion vector of the current block may be included based on a motion vector of the block C3. When the temporal motion vector candidate of the current block cannot be derived from the block H and the block C3 (for example, when the block H and the block C3 are intra encoded), a temporal motion vector candidate for the current block may not be derived or may be derived from a block having different location from the block H and the block C3.

As another example, a temporal motion vector candidate of the current block may be derived from multiple blocks in a collocated picture. For example, multiple temporal motion vector candidates for the current block may be derived from the block H and the block C3.

In FIG. 15, a temporal motion vector candidate of the current block may be derived from a block adjacent to the lower left corner of the collocated block or from a block including the central point of the collocated block. However, the location of a block for deriving a temporal motion vector candidate of a current block is not limited to the example shown in FIG. 15. For example, a temporal prediction candidate of a current block may be derived from a block adjacent to an upper/lower boundary, a left/right boundary, or a corner of a collocated block, or may be derived from a block including a particular location within the collocated block (for example, a block adjacent to a corner boundary of the collocated block).

A temporal motion vector candidate of a current block may be determined based on the current block and a reference picture list (or a prediction direction) of a block located at the inside or outside of a collocated block.

For example, when a reference picture list that the current block may use is L0 (namely, an inter-prediction indicator indicates PRED_L0), a motion vector of a block using L0 as a reference picture among blocks located at the inside or outside of the collocated block may be derived as a temporal motion vector candidate of the current block. That is, when a reference picture list that the current block may use is LX (here, X is an integer such as 0, 1, 2, or 3, etc. that indicates an index of a reference picture list), a motion vector of a block using LX as a reference picture among blocks located at the inside or outside of the collocated block may be derived as a temporal motion vector candidate of the current block.

Even when the current block uses multiple reference picture lists, a temporal motion vector candidate of the current block may be determined based on whether the current block has the same reference picture list as a block located at the inside or outside of a collocated block.

For example, when the current block performs bi-directional prediction (namely, when an inter-prediction indicator is PRED_BI), a motion vector of a block using L0 and L1 as reference pictures among blocks located at the inside or outside of the collocated block may be derived as a temporal motion vector candidate of the current block. When the current block performs tri-directional prediction (namely, when an inter-prediction indicator is PRED_TRI), a motion vector of a block using L0, L1, and L2 as reference pictures among blocks located at the inside or outside of a collocated block may be derived as a temporal motion vector candidate of the current block. When the current block performs quad-directional prediction (namely, when an inter-prediction indicator is PRED_QUAD), a motion vector of a block using L0, L1, L2, and L3 as reference pictures among blocks located at the inside or outside of a collocated block may be derived as a temporal motion vector candidate of the current block.

Alternatively, when the current block is set to perform multi-directional prediction through one reference picture, a temporal motion prediction vector candidate of the current block may be determined based on whether an outer block has the same reference picture list and the same prediction direction as the current block.

For example, when the current block performs bi-directional prediction for a reference picture list L0 (namely, when an inter-prediction indicator for a list L0 is PRED_BI), a motion vector of a block performing bi-directional prediction for L0 by using L0 as a reference picture among blocks located at the inside or outside of a collocated block may be derived as a temporal motion vector candidate of the current block.

In addition, a temporal motion vector candidate may be derived based on at least one coding parameter.

The temporal motion vector candidate may be preparatorily derived when the number of derived spatial motion vector candidates is less than the maximum number of motion vector candidates. Accordingly, when the number of derived spatial motion vector candidates is equal to the maximum number of motion vector candidates, the deriving of the temporal motion vector candidate may be omitted.

For example, when the maximum number of motion vector candidates is two and two derived spatial motion vector candidates have different values, the deriving of the temporal motion vector candidate may be omitted.

As another example, a temporal motion vector candidate of the current block may be derived based on the maximum number of temporal motion vector candidates. Here, the maximum number of temporal motion vector candidates may be preset to have the same value in the encoding apparatus and the decoding apparatus. Alternatively, information indicating the maximum number of temporal motion vector candidates of the current block may be transmitted to the decoding apparatus through a bitstream by being encoded. For example, the encoding apparatus may encode 'maxNumTemporalMVPCand' indicating the maximum number of temporal motion vector candidates of the current block, and may transmit 'maxNumTemporalMVPCand' to the decoding apparatus through a bitstream. Here, 'maxNumTemporalMVPCand' may be set as a positive integer including zero. For example, 'maxNumTemporalMVPCand' may be set to one.

When a distance between a current picture including a current block and a reference picture of the current block is different from a distance between a collocated picture including a collocated block and a reference picture of the collocated block, a temporal motion vector candidate of the current block may be obtained by scaling a motion vector of the collocated block.

Figure 16:
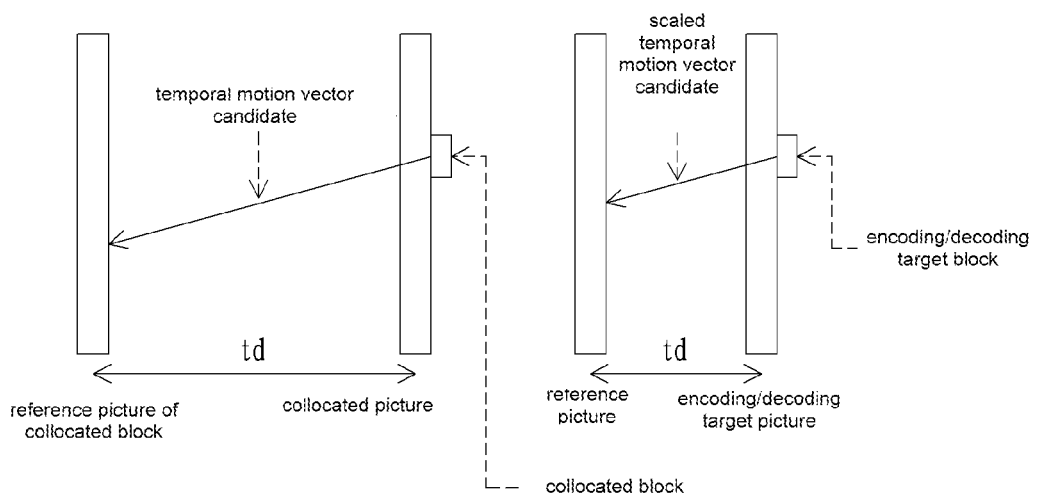
FIG. 16 is a view illustrating an example of scaling a motion vector of a collocated block to derive temporal motion vector candidates of a current block.

FIG. 16 is a view illustrating an example of scaling a motion vector of a collocated block to derive temporal motion vector candidates of a current block.

A motion vector of a collocated vector may be scaled based on at least one of a difference value (td) between POC (Picture order count) indicating a display order of collocated pictures and POC of a reference picture of a collocated block, and a difference value (tb) between POC of a current picture and POC of a reference picture of the current block.

Before scaling, td or tb may be adjusted to be exist within a predetermined range. For example, when the predetermined range indicates −128 to 127 and td or tb is less than −128, td or tb may be adjusted to −128. When td or tb is larger than 127, td or tb may be adjusted to 127. When td or tb is within a range of −128 to 127, td or tb are not adjusted.

A scaling factor DistScaleFactor may be calculated based on td or tb. Here, the scaling factor may be calculated based on the following formula 1.

$$DistScaleFactor=(tb*tx+32)\gg 6.$$

$$tx=(16384+Abs(td/2))/td \quad \text{[Formula 1]}$$

In formula 1, an absolute value function is indicated as Abs( ), and the output value of the function is the absolute value of the input value.

A value of the scaling factor DistScaleFactor calculated based on formula 1 may be adjusted in a predetermined range. For example, DistScaleFactor may be adjusted to be exist within a range of −1024 to 1023.

A temporal motion vector candidate of the current block may be determined by scaling a motion vector of a collocated block through a scaling factor. For example, a temporal motion vector candidate of the current block may be determined by the following formula 2.

$$Sign(DistScaleFactor*mvCol)*((Abs(DistScaleFactor*mvCol)+127)\gg 8) \quad \text{[Formula 2]}$$

In formula 2, Sign( ) is a function that outputs sign information of the value contained in ( ). For example, Sign(−1) outputs − (negative). In formula 2, mvCol indicates a motion vector of a collocated block, namely, a temporal motion vector predictor before scaling.

Next, motion vector candidate list based on derived motion vector candidates S1202 and S1303 will be disclosed.

The generating of the motion vector candidate list may include adding or removing of a motion vector candidate to or from the motion vector candidate list and adding of a combined motion vector candidate to the motion vector candidate list.

In the adding or removing of the derived motion vector candidate to or from the motion vector candidate list, the encoding apparatus and the decoding apparatus may add the derived motion vector candidate to the motion vector candidate list in a deriving order of motion vector candidates.

The generated motion vector candidate list may be determined according to an inter-prediction direction of the current block. For example, one motion vector candidate list may be generated for each reference picture list, and one motion vector candidate list may be generated for each reference picture. Multiple reference picture lists or multiple reference pictures may share one motion vector candidate list.

In the embodiment described below, it is assumed that a motion vector candidate list mvpListLX means a motion vector candidate list corresponding to reference picture lists L0, L1, L2, and L3. For example, a motion vector candidate list corresponding to a reference picture list L0 may be referred to as mvpListL0.

The number of motion vector candidates included in the motion vector candidate list may be set to have the same preset value in the encoding apparatus and the decoding apparatus. Alternatively, the maximum number of motion vector candidates included in the motion vector candidate list may be transmitted to the decoding apparatus through a bitstream by being encoded in the encoding apparatus.

For example, the maximum number of motion vector candidates maxNumMVPCandList that can be included in the motion vector candidate list mvpListLX may be a positive integer including zero. For example, maxNumMVPCandList may be an integer such as 2, 3, 4, 5, 6, 7, 8, 9, 10, 11, 12, 13, 14, 15, or 16, etc. When maxNumMVP-CandList is 2, it means that mvpListLX may include maximum two motion vector candidates. Accordingly, an index value of a motion vector candidate being added to mvpListLX first may be set to zero, and an index value of a motion vector candidate being added subsequently may be set to one. The maximum number of motion vector candidates may be defined for each motion vector candidate list, and may be equally defined for all motion vector candidate lists. For example, the maximum motion vector candidates of mvpListL0 and mvpListL1 may have different values, and may be have the same values.

FIG. 17 is a view illustrating an example of generating a motion vector candidate list.

It is assumed that a spatial motion vector candidate (1, 0) that is not spatially scaled is derived from a block at a location A1 shown in FIG. 17(a), and a temporal motion vector candidate (2, 3) being scaled is derived from a block at a location H shown in FIG. 17(b). In this case, as shown in FIG. 17(c), the spatial motion vector candidate derived from the block at the location A1 and the temporal motion vector candidate derived from the block at the location H may be added to the motion vector candidate list in order.

Derived motion vector candidate may be added to the motion vector candidate list in a predetermined order. For example, after adding the spatial motion vector candidate to the motion vector candidate list, when the number of motion vector candidates included in the motion vector candidate list is less than the maximum number of motion vector candidates, the temporal motion vector candidate may be added to the motion vector candidate list. In contrast, the temporal motion vector candidate may be added to the motion vector candidate list by having higher priority than that of the spatial motion vector candidate. In this case, according to whether or not being the same as the temporal motion vector candidate, the spatial motion vector candidate may be optionally added to the motion vector candidate list.

In addition, the encoding apparatus and the decoding apparatus may assign an index for identifying each motion vector candidate in an order of being added to the motion vector candidate list. In FIG. 17(c), an index value of the motion vector candidate derived from the block at the location A1 is set to 0, and an index value of the motion vector candidate derived from the block at the location H is set to 1.

Besides the spatial motion vector candidate and the temporal motion vector candidate, a motion vector having a predetermined value may be added to the motion vector candidate list. For example, when the number of motion vector candidates included in the motion vector list is less than the maximum number of motion vector candidates, a motion vector having a value of 0 may be added to the motion vector candidate list.

FIG. 18 is a view illustrating an example of adding a motion vector having a predetermined value to a motion vector candidate list.

In the example shown in FIG. 18, 'numMVPCandLX' indicates the number of motion vector candidates included in a motion vector candidate list mvpListLX. For example, numMVPCandL0 may indicate the number of motion vector candidates included in the motion vector candidate list mvpListL0.

In addition, maxNumMVPCand indicates the maximum number of motion vector candidates that can be included in the motion vector candidate list mvpListLX. The numMVPCandLX and the maxNumMVPCand may have an integer value including zero.

When the numMVPCandLX is less than the maxNumMVPCand, a motion vector having a predetermined value may be added to the motion vector candidate list, and the value of the numMVPCandLX may be increased by 1. Here, the motion vector being added to the motion vector candidate list may have a fixed value, and may be added to the motion vector candidate list last. For example, a motion vector having a predetermined value and being added to the motion vector candidate list may be a zero motion vector candidate having a value of (0, 0).

For example, as shown in FIG. 18(a), when the numMVPCandLX is 1 and the maxNumMVPCand is 2, one zero motion vector candidate having a value of (0, 0) may be added to the motion vector candidate list, and the value of the numMVPCandLX may be increased by 1.

When a difference value between the maxNumMVPCand and the numMVPCandLX is equal to or greater than 2, a motion vector having a predetermined value may be repeatedly added to the motion vector candidate list by the difference value.

For example, when the maxNumMVPCand is 2 and the numMVPCandLX is 0, a motion vector having a predetermined value may be repeatedly added to the motion vector candidate list until the numMVPCandLX becomes equal to the maxNumMVPCand. In FIG. 18(b), two zero motion vector candidates having values of (0, 0) are added to the motion vector candidate list.

As another example, a motion vector having a predetermined value may be added to the motion vector candidate list only when a motion vector candidate that is equal to the motion vector having the predetermined value is not included in the motion vector candidate list.

For example, when the numMVPCandLX is less than the maxNumMVPCand and a motion vector having (0, 0) is not included in the motion vector candidate list, as shown in FIG. 18(c), the motion vector having (0, 0) may be added to the motion vector candidate list and the numMVPCandLX may be increased by 1.

FIG. 18 illustrates that a predefined value of a motion vector being added to the motion vector candidate list is (0, 0), but the predefined value of the motion vector being added to the motion vector candidate list is not limited thereto. In addition, as shown in FIG. 18(b), when adding multiple predefined motion vector candidates, multiple predefined motion vectors being added to the motion vector candidate list may be different values.

The encoding apparatus and the decoding apparatus may adjust the size of the motion vector candidate list by removing the motion vector candidate included in the motion vector candidate list.

For example, the encoding apparatus and the decoding apparatus may identify whether or not the same motion vector candidates exist in the motion vector candidate list. When the same motion vector candidates exist in the motion vector candidate list, a residual motion vector candidate excluding a motion vector candidate having the smallest motion vector candidate index among the same motion vector candidates may be removed from the motion vector candidate list.

Determining whether motion vector candidates are the same may be applied to only a space between spatial motion vectors or a space between temporal motion vectors, and may be applied to a space between the spatial motion vector and the temporal motion vector.

When the number of motion vector candidates included in the motion vector candidate list is greater than the maximum number of motion vector candidates that can be included in the motion vector candidate list, a motion vector candidate may be removed from the motion vector candidate list by a difference value between the number of motion vector candidates included in the motion vector candidate list and the maximum number of motion vector candidates.

FIG. 19 is a view illustrating an example of removing a motion vector candidate from a motion vector candidate list.

When the numMVPCandLX is equal to or greater than the maxNumMVPCand, a motion vector candidate having an index value greater than maxNumMVPCand−1 may be removed from the motion vector candidate list.

For example, in the example shown in FIG. 19, when the numMVPCandLX is 3 and the maxNumMVPCand is 2, a motion vector candidate of (4, −3) to which an index of 2 greater than maxNumMVPCand−1 is assigned is removed from the motion vector candidate list.

Next, the adding of the combined motion vector candidate to the motion vector candidate list will be disclosed.

When the number of motion vector candidates included in the motion vector candidate list is less than the maximum number of motion vector candidates, the combined motion vector by using at least one of the motion vector candidates included in the motion vector candidate list may be added to the motion vector candidate list. For example, by using at least one of: a spatial motion vector candidate, a temporal motion vector candidate, and a zero motion vector candidate included in the motion vector candidate list, a combined motion vector candidate is generated, and the generated combined motion vector candidate may be included in the motion vector candidate list.

Alternatively, by using a motion vector candidate that is not included in the motion vector candidate list, a combined motion vector candidate may be generated. For example, a combined motion vector candidate may be generated by using a motion vector candidate, which is not included in the motion vector candidate list, being derived from a block that may be used for deriving at least one of a spatial motion vector candidate or a temporal motion vector candidate, or by using a motion vector candidate (for example, a zero motion vector) having a predefined value that is not included in the motion vector candidate list.

Alternatively, the combined motion vector candidate may be generated based on at least one of coding parameters, or the combined motion vector candidate may be added to the motion vector candidate list based on at least one of coding parameters.

The maximum number of motion vector candidates that can be included in the motion vector candidate list may increase by the number of combined motion vectors or by the less number after adding at least one of a spatial motion vector candidate, a temporal motion vector candidate, or a motion vector candidate having a preset value. For example, the maxNumMVPCandList has a first value for a spatial motion vector candidate or a temporal motion vector candidate, and after adding the spatial motion vector candidate or the temporal motion vector candidate, the maxNumMVPCandList may be increased to a second value greater than the first value so as to add the combined motion vector candidate.

FIG. 20 is a view illustrating an example of a motion vector candidate list.

Motion compensation may be performed on the current block by using a motion vector candidate included in the motion vector candidate list. Motion compensation of the current block may be performed by using one motion vector for one reference picture list, or by using multiple motion vectors for one reference picture list. For example, when an inter-prediction direction of the current block is bi-directional, motion compensation of the current block may be performed by deriving one motion vector for each of the reference picture lists L0 and L1, or by deriving two motion vectors for the reference picture list L0.

The motion vector candidate list may include at least one of combined motion vector candidates generated by combining a spatial motion vector candidate, a temporal motion vector candidate, and a zero motion vector candidate, and by combining at least two thereof. Each motion vector candidate may be identified by a motion vector candidate index.

Based on an inter-prediction direction of the current block, a motion vector candidate set including multiple motion vector candidates may be identified by one motion vector candidate index. Here, the motion vector candidate set may include N motion vector candidates according to the number N of inter-prediction directions of the current block. For example, a motion vector candidate set may include multiple motion vector candidates such as a first motion vector candidate, a second motion vector candidate, a third motion vector candidate, and a fourth motion vector candidate, etc.

The motion vector candidate set may be generated by combining at least two of: a spatial motion vector candidate, a temporal motion vector candidate, and a zero motion vector candidate. For example, in FIG. 20, a motion vector candidate set including two motion vector candidates is assigned to motion vector candidate indexes of 4 to 13. In addition, each motion vector candidate set may be generated by combining spatial motion vector candidates (mxLXA, mxLXB), a temporal motion vector (mxLXCol), and a zero motion vector (mvZero).

According to a prediction direction for a reference picture list LX, at least one motion vector may be derived from the reference picture list. For example, when uni-directional prediction is performed on the reference picture list LX, a motion vector of the current block may be derived by using one of motion vector candidates assigned to motion vector indexes of 0 to 3. In contrast, when bi-directional prediction is performed on the reference picture list LX, a motion vector of the current block may be derived by using motion vector candidates sets assigned to motion vector indexes of 4 to 13. That is, in an encoding/decoding process, at least one motion vector may be derived based on the motion vector candidate included in the motion vector candidate list.

A motion vector of the current block may be derived by adding a motion vector difference value to a motion vector candidate. For example, FIG. 20 shows that when a motion vector candidate of one of motion vector candidate indexes of 0 to 3 is selected, a motion vector difference value (MVD) is added to the selected motion vector candidate to derive a motion vector.

When a motion vector candidate set including multiple motion vector candidates is selected, multiple motion vectors for the current block may be derived based on the multiple motion vector candidates included in the motion vector candidate set. Here, a motion vector difference value for each of the multiple motion vector candidates included in the motion vector candidate set may be encoded/decoded. In this case, for the current block, multiple motion vectors may be derived by adding motion vector difference values corresponding to motion vector candidates.

As another example, a motion vector difference value for a part of the multiple motion vector candidates included in the motion vector candidate set may be encoded/decoded. For example, one motion vector difference value may be encoded/decoded for the motion vector candidate set including the multiple motion vector candidates. In this case, the current block may use a motion vector derived by adding a motion vector difference value to one motion vector candidate included in the motion vector candidate set, and may use a motion vector derived from a motion vector candidate. FIG. 20 shows that for the motion vector candidate set including two motion vector candidates, a first motion vector or a second motion vector is derived by adding a motion vector difference value to one motion vector candidate, and a remaining one is the same as the motion vector candidate.

As another example, the multiple motion vector candidates included in the motion vector candidate set may share the same motion vector difference value.

An inter-prediction indicator may indicate uni-directional prediction or multi-directional prediction for a predetermined reference picture list. For example, the inter-prediction indicator may be designated as PRED_LX indicating uni-directional prediction for a reference picture list LX, and may be designated as PRED_BI_LX indicating bi-directional prediction for a reference picture list LX. Here, an index of a reference picture list may be indicated as X that is an integer including 0 such as 0, 1, 2, 3, etc.

For example, when performing uni-directional prediction for the reference picture list L0, the inter-prediction indicator may be set to PRED_L0. In addition, when performing uni-directional prediction for the reference picture list L1, the inter-prediction indicator may be set to PRED_L1.

In contrast, when performing bi-directional prediction for the reference picture list L1, the inter-prediction indicator may be set to PRED_BI_L1. When the inter-prediction indicator for the reference picture list L1 is PRED_BI_L1, the current block uses the motion vector candidate list to derive two motion vectors, and inter prediction may be performed by deriving two prediction blocks from the reference picture included in the reference picture list L1. Here, two prediction blocks may be respectively derived from two different reference pictures included in the reference picture list L1, or may be derived from one reference picture included in the reference picture list L1.

The inter-prediction indicator may be encoded/decoded to indicate the number of entire prediction direction for the current block, and may be encoded/decoded to indicate the number of prediction directions of each reference picture list.

For example, an inter-prediction indicator (PRED_L0) indicating uni-directional prediction for the reference picture list L0 an inter-prediction indicator (PRED_BI_L1) indicating bi-directional prediction for the reference picture list L1 may be encoded for the current block. Alternatively, when performing uni-directional prediction for the reference picture list L0 and performing bi-directional prediction for the reference picture list L1, the inter-prediction indicator for the current block may indicate PRED_TRI.

FIG. 20 shows an example of a motion vector candidate list mvpListLX for a particular reference picture list LX. When multiple reference picture lists exist such as L0, L1, L2, L3, etc., a motion vector candidate list may be generated for each reference picture list. Accordingly, at least one prediction block up to at most N prediction blocks may be generated to be used in inter prediction or motion compensation of the current block. Here, N indicates an integer equal to or greater than 1 such as 2, 3, 4, 5, 6, 7, 8, etc.

At least one of the motion vector candidates included in the motion vector candidate list may be determined as a predicted motion vector for the current block (or a motion vector predictor). The determined predicted motion vector may be used in calculating the motion vector of the current block, and the motion vector may be used in inter prediction or motion compensation of the current block.

In the current block, when the motion vector candidate set including the multiple motion vector candidates is selected, the multiple motion vector candidates included in the motion vector candidate set and the motion vector of the current block calculated based on the multiple motion vector candidates may be stored as information about motion compensation of the current block. Here, the stored information about motion compensation of the current block may be utilized later when generating a motion vector candidate list or performing motion compensation in a neighboring block.

FIG. 20 shows an example where a motion vector candidate list is generated for each reference picture list. The motion vector candidate list may be generated for each reference picture. For example, when performing bi-directional prediction for the reference picture list LX, among reference pictures included in the reference picture list LX, a first motion vector candidate list may be generated for a first reference picture used in bi-directional prediction, and a second motion vector candidate list may be generated for a second reference picture used in bi-directional prediction.

Next, the determining of the motion vector predicted from the motion vector candidate list S1203 and S1304 will be disclosed.

Among motion vector candidates included in the motion vector candidate list, a motion vector candidate indicated by a motion vector candidate index may be determined as a motion vector for the current block.

Figures 21, 22A:
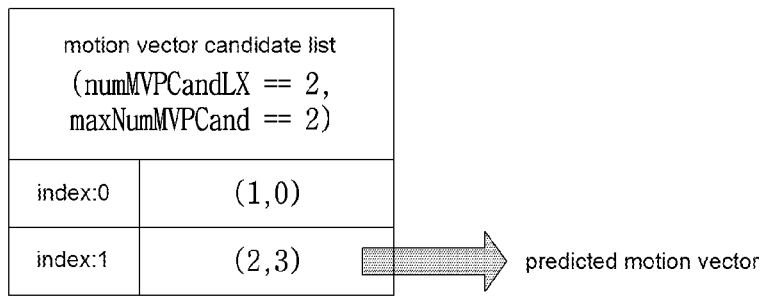
FIG. 21 is a view illustrating an example of deriving a predicted motion vector candidate of a current block from a motion vector candidate list.

FIG. 21 is a view illustrating an example of deriving a predicted motion vector candidate of a current block from a motion vector candidate list.

FIG. 21 shows that the maximum number of motion vector candidates maxNumMVPC that can be included in the motion vector candidate list is 2 and the number of motion vector candidates included in the motion vector candidate list is 2. Here, when the motion vector candidate index indicates the index 1, a second motion vector candidate (namely, a motion vector candidate to which the index 1 is assigned) having (2, 3) included in the motion vector candidate list may be determined as a predicted motion vector of the current block.

The encoding apparatus may obtain a motion vector difference value by calculating a difference between the motion vector and the predicted motion vector. The decoding apparatus may obtain a motion vector by adding the predicted motion vector and the motion vector difference.

Although not shown, when the motion vector candidate index indicates the motion vector candidate set, multiple motion vectors may be derived from multiple motion vector candidates included in the motion vector candidate set. Here, the motion vector of the current block may be the sum of the motion vector candidate and the motion vector difference, and may have the same value as the motion vector candidate.

Next, the performing of motion compensation by using the motion vector S1204 and S1305 will be disclosed.

The encoding apparatus and the decoding apparatus may calculate a motion vector by using a predicted motion vector and a motion vector difference value. When the motion vector is calculated, inter prediction or motion compensation may be performed by using the calculated motion vector. Alternatively, as shown in FIG. 20, the motion vector prediction value may be determined as the motion vector.

The current block may have at least one motion vector up to at most N motion vectors depending on a prediction direction. At least one prediction block up to at most N prediction blocks may be generated by using the motion vector to derive a final prediction block of the current block.

For example, when the current block has one motion vector, the prediction block generated by using the motion vector may be determined as the final prediction block of the current block.

In contrast, when the current block has multiple motion vectors, multiple prediction blocks may be generated by using multiple motion vectors, and the final prediction block of the current block may be determined based on a weighted sum of multiple prediction blocks. Reference pictures including multiple prediction blocks indicated by multiple motion vectors may be included in different reference picture lists, and may be included in the same reference picture list.

A weighting being applied to each prediction block may have the same value by 1/N (here, N is the number of generated prediction blocks). For example, when two prediction blocks are generated, a weighting being applied to each prediction block may be ½. When three prediction blocks are generated, a weighting being applied to each prediction block may be ⅓. When four prediction blocks are generated, a weighting being applied to each prediction block may be ¼. Alternatively, the final prediction block of the current block may be determined by assigning different weightings to respective prediction blocks.

The weighting does not have to have a fixed value for each prediction block, and may have a variable value for each prediction block. Here, the weightings being applied to respective prediction blocks may be the same, or may be different. In order to apply a variable weighting, one or more pieces of weighting information for the current block may be signaled through a bitstream. The weighting information may be signaled for each prediction block, and may be signaled for each reference picture. Multiple prediction blocks may share one piece of weighting information.

Formulas 3 to 5 described below indicate an example of generating a final prediction block of the current block when inter-prediction indicators of the current block are PRED_BI, PRED_TRI, and PRED_QUAD and a prediction direction for each reference picture list is uni-directional.

$$P\_BI = (WF\_L0*P\_L0 + OFFSET\_L0 + WF\_L1*P\_L1 + OFFSET\_L1 + RF) \gg 1.$$ [Formula 3]

$$P\_TRI = (WF\_L0*P\_L0 + OFFSET\_L0 + WF\_L1*P\_L1 + OFFSET\_L1 + WF\_L2*P\_L2 + OFFSET\_L2 + RF)/3$$ [Formula 4]

$$P\_QUAD = (WF\_L0*P\_L0 + OFFSET\_L0 + WF\_L1*P\_L1 + OFFSET\_L1 + WF\_L2*P\_L2 + OFFSET\_L2 + WF\_L3*P\_L3 + OFFSET\_L3 + RF) \gg 2.$$ [Formula 5]

In formulas 3 to 5, P_BI, P_TRI, and P_QUAD may indicate the final prediction block of the current block, and LX (X=0, 1, 2, 3) may mean a reference picture list. WF_LX may indicate a weighting value of a prediction block generated by using the LX, and OFFSET_LX may indicate an offset value for the prediction block generated by using the LX. P_LX may mean a prediction block generated by using a motion vector for the LX of the current block. RF may mean a rounding factor that may be set to zero, a positive number, or a negative number.

Even when the prediction direction for the predetermined reference picture list is a plurality of directions, the final prediction block for the current block may be obtained based on a weighted sum of prediction blocks. Here, weightings being applied to prediction blocks derived from the same reference picture list may have the same values, or may have different values.

At least one of a weighting (WF_LX) and an offset (OFFSET_LX) for multiple prediction blocks may be a coding parameter being entropy encoded/decoded. As another example, the weighting and the offset may be derived from an encoded/decoded neighboring block adjacent to the current block. Here, the neighboring block adjacent to the current block may include at least one of a block used for deriving the spatial motion vector candidate of the current block or a block used for deriving the temporal motion vector candidate of the current block.

As another example, the weighting and the offset may be determined based on a display order of a current picture and reference pictures (POC). In this case, when the current picture is far from the reference picture, the weighting or the offset may be set to a small value. When the current picture is close to the reference picture, the weighting or the offset may be set to a large value. For example, when a POC difference between the current picture and an L0 reference picture is 2, a weighting value being applied to a prediction block generated by referring to the L0 reference picture may be set to ⅓. In contrast, when a POC difference between the current picture and the L0 reference picture is 1, a weighting value being applied to a prediction block generated by referring to the L0 reference picture may be set to ⅔. As described above, the weighting or offset value may have an inverse relation with the display order difference between the current picture and the reference picture. As another example, the weighting or offset value may have a proportional relation with the display order difference between the current picture and the reference picture.

As another example, based on at least one of coding parameters, at least one of the weighting or the offset may be entropy encoded/decoded. In addition, based on at least one of coding parameters, a weighted sum of prediction blocks may be calculated.

Next, a process of entropy encoding/decoding information about motion compensation S1205 and S1301 will be disclosed in detail.

FIG. 22 (FIGS. 22A and 22B) is a view illustrating an example of syntax for information about motion compensation.

The encoding apparatus may entropy encode the information about motion compensation through a bitstream, and the decoding apparatus may entropy decode the information about motion compensation included in the bitstream. Here, the information about motion compensation being entropy encoded/decoded may include at least one of an inter-prediction indicator (inter_pred_idc), a reference picture index (ref_idx_10, ref_idx_11, ref_idx_12, ref_idx_13), a motion vector candidate index (mvp_10_idx, mvp_11_idx, mvp_12_idx, mvp_13_idx), a motion vector difference, a weighting value (wf_10, wf_11, wf_12, wf_13), and an offset value (offset_10, offset_11, offset_12, offset_13).

The inter-prediction indicator may mean inter-prediction direction of the current block when the current block is encoded/decoded through inter prediction. For example, the inter-prediction indicator may indicate uni-directional prediction, or multi-directional prediction such as bi-directional prediction, tri-directional prediction, or quad-directional prediction, etc. The inter-prediction indicator may mean the number of reference pictures that are used when the current block generates the prediction block. Alternatively, one reference picture may be used for multi-directional prediction. In this case, M reference pictures are used to perform N-directional prediction (N>M). The inter-prediction indicator may mean the number of prediction blocks that are used when performing inter prediction or motion compensation for the current block.

As described above, based on the inter-prediction indicator, the number of reference pictures used in generating the prediction block of the current block, the number of prediction blocks used in performing inter prediction or motion compensation of the current block, or the number of reference picture lists that the current block may use, etc. may be determined. Here, the number N of the reference picture lists is a positive integer such as 1, 2, 3, 4, or a greater value. For example, the reference picture lists may include L0, L1, L2, and L3, etc. Motion compensation may be performed on the current block by using at least one reference picture list.

For example, the current block may generate at least one prediction block by using at least one reference picture list, whereby motion compensation of the current block can be performed. For example, one or more prediction blocks may be generated by using the reference picture list L0 so as to perform motion compensation, or one or more prediction blocks may be generated by using the reference picture lists L0 and L1 so as to perform motion compensation. Alternatively, one or more prediction blocks or at most N prediction blocks (here, N is a positive integer equal to or greater than 2 or 3) may be generated by using the reference picture lists L0, L1, and L2 so as to perform motion compensation. Alternatively, one or more prediction blocks or at most N prediction blocks (here, N is a positive integer equal to or greater than 2 or 4) may be generated by using the reference picture lists L0, L1, L2, and L3 so as to perform motion compensation for the current block.

A reference picture indicator may indicate a uni-direction (PRED_LX), a bi-direction (PRED_BI), a tri-direction (PRED_TRI), a quad-direction (PRED_QUAD), or greater direction depending on the number of prediction direction of the current block.

For example, when uni-directional prediction is performed for each reference picture list, the inter-prediction indicator PRED_LX may mean that one prediction block is generated by using a reference picture list LX (X is an integer such as 0, 1, 2, or 3, etc.) and inter prediction or motion compensation is performed by using the generated one prediction block. The inter-prediction indicator PRED_BI may mean that two prediction blocks are generated by using the reference picture lists L0 and L1 and inter prediction or motion compensation is performed by using the generated two prediction blocks. The inter-prediction indicator PRED_TRI may mean that three prediction blocks are generated by using the reference picture lists L0, L1, and L2 and inter prediction or motion compensation is performed by using the generated three prediction blocks. The inter-prediction indicator PRED_QUAD may mean that four prediction blocks are generated by using the reference picture lists L0, L1, L2, and L3 and inter prediction or motion compensation is performed by using the generated four prediction blocks. That is, the sum of the number of prediction blocks used in performing inter prediction of the current block may be set to the inter-prediction indicator.

When performing multi-directional prediction for the reference picture list, the inter-prediction indicator PRED_BI may mean performing bi-directional prediction for the reference picture list L0. The inter-prediction indicator PRED_TRI may mean performing tri-directional prediction for the reference picture list L0; performing uni-directional prediction for the reference picture list L0 and performing bi-directional prediction for the reference picture list L1; or performing bi-directional prediction for the reference picture list L0 and performing uni-directional prediction for the reference picture list L1.

As described above, the inter-prediction indicator may mean that at least one to at most N prediction blocks are generated from at least one reference picture list so as to perform motion compensation (here, N is the number of prediction directions indicated by the inter-prediction indicator). Alternatively, the inter-prediction indicator may mean that at least one to at most N prediction blocks are generated from N reference pictures and motion compensation for the current block is performed by using the generated prediction blocks.

For example, the inter-prediction indicator PRED_TRI may mean that three prediction blocks are generated by using at least one of the reference picture lists L0, L1, L2, and L3 so as to perform inter prediction or motion compensation of the current block. Alternatively, the inter-prediction indicator PRED_TRI may mean that three prediction blocks are generated by using at least three of the reference picture lists L0, L1, L2, and L3 so as to perform inter prediction or motion compensation of the current block. In addition, the inter-prediction indicator PRED_QUAD may mean that four prediction blocks are generated by using at least one of the reference picture lists L0, L1, L2, and L3 so as to perform inter prediction or motion compensation of the current block. Alternatively, the inter-prediction indicator PRED_QUAD may mean that four prediction blocks are generated by using at least four of the reference picture lists L0, L1, L2, and L3 so as to perform inter prediction or motion compensation of the current block.

Available inter-prediction directions may be determined according to the inter-prediction indicator, and all or some of the available inter-prediction directions may be selectively used based on the size and/or shape of the current block.

The number of reference pictures included in each reference picture list may be predefined, or may be transmitted to the decoding apparatus by being entropy encoded in the encoding apparatus. For example, a syntax element 'num_ref_idx_1X_active_minus1' (here, X indicates an index of a reference picture list such as 0, 1, 2, 3, etc.) may indicate the number of reference pictures for the reference picture list such as L0, L1, L2, or L3.

The reference picture index may specify a reference picture being referenced by the current block in each reference picture list. At least one reference picture index may be entropy encoded/decoded for each reference picture list. Motion compensation may be performed on the current block by using at least one reference picture index.

When N reference pictures are selected through N reference picture indexes, motion compensation for the current block may be performed by generating at least one to N (or more than N) prediction blocks.

The motion vector candidate index indicates a motion vector candidate for the current block in a motion vector candidate list generated for each reference picture list or for each reference picture index. At least one motion vector candidate index for each motion vector candidate list may be entropy encoded/decoded. Motion compensation may be performed on the current block by using at least one motion vector candidate index.

For example, based on N motion vector candidate indexes, motion compensation for the current block may be performed by generating at least one to N (or more than N) prediction blocks.

The motion vector difference indicates a difference value between a motion vector and a predicted motion vector. At least one motion vector difference may be entropy encoded/decoded for the motion vector candidate list generated for each reference picture list or each reference picture index for the current block. Motion compensation may be performed on the current block by using at least one motion vector difference.

For example, motion compensation may be performed on the current block by generating at least one to at most N (or more than N) prediction blocks through N motion vector differences.

When two or more prediction blocks are generated during motion compensation for the current block, the final prediction block for the current block may be generated through a weighted sum for each prediction block. When calculating a weighted sum, at least one of a weighting and an offset may be applied for each prediction block. A weighted sum factor such as the weighting or the offset, etc. used in calculating a weighted sum may be entropy encoded/decoded for at least one of a reference picture list, a reference picture, a motion vector candidate index, a motion vector difference, or a motion vector.

The weighted sum factor may be derived by index information specifying one of predefined sets in the encoding apparatus and the decoding apparatus. In this case, index information for specifying at least one of a weighting and an offset may be entropy encoded/decoded.

Information related to a weighted sum factor may be entropy encoded/decoded by a block unit, and may be entropy encoded/decoded at a higher level. For example, the weighting or the offset may be entropy encoded/decoded by a block unit such as a CTU, a CU, or a PU, etc., or may be entropy encoded/decoded at a higher level such as a video parameter set, a sequence parameter set, a picture parameter set, a adaptation parameter set, or a slice header, etc.

The weighted sum factor may be entropy encoded/decoded based on a weighted sum factor difference value indicating a difference value between a weighted sum factor and a weighted sum factor prediction value. For example, a weighting prediction value and a weighting difference value may be entropy encoded/decoded, or an offset prediction value and an offset difference value may be entropy encoded/decoded. Here, the weighting difference value may indicate a difference value between the weighting and the weighting prediction value, and the offset difference value may indicate a difference value between the offset and the offset prediction value.

Here, the weighted sum factor difference value may be entropy encoded/decoded by a block unit, and the weighted sum factor prediction value may be entropy encoded/decoded at a higher level. When the weighted sum factor prediction value such as the weighting prediction value or the offset prediction value, etc. is entropy encoded/decoded by a picture or slice unit, blocks included in the picture or the slice may use a common weighted sum factor prediction value.

The weighted sum factor prediction value may be derived through a particular region within an image, a slice or a tile or through a particular region within a CTU or a CU. For example, the weighting value or offset value of a particular region within an image, a slice, a tile, a CTU or a CU may be used as the weighting prediction value or the offset prediction value. In this case, entropy encoding/decoding of the weighted sum factor prediction value may be omitted, and entropy encoding/decoding of only the weighted sum factor difference value may be performed.

Alternatively, a weighted sum factor prediction value may be derived from an encoded/decoded neighboring block adjacent to the current block. For example, the weighting value or the offset value of the encoded/decoded neighboring block adjacent to the current block may be set to the weighting prediction value or the offset prediction value of the current block. Here, the neighboring block of the current block may include at least one of a block used in deriving the spatial motion vector candidate and a block used in deriving the temporal motion vector candidate.

When using the weighting prediction value and the weighting difference value, the decoding apparatus may calculate a weighting value for a prediction block by adding the weighting prediction value and the weighting difference value. In addition, when using the offset prediction value and the offset difference value, the decoding apparatus may calculate an offset value for the prediction block by adding the offset prediction value and the offset difference value.

Instead of entropy encoding/decoding information about a weighted sum factor of the current block, a weighted sum factor of an encoded/decoded block adjacent to the current block may be used as a weighted sum factor of the current block. For example, the weighting or the offset of the current block may be set to have the same value as the weighting or the offset of the encoded/decoded neighboring block adjacent to the current block.

At least one piece of information about motion compensation may be entropy encoded/decoded through a bitstream by using a coding parameter, or at least one piece of information about motion compensation may be derived by using at least one coding parameter.

When entropy encoding/decoding the information about motion compensation, a binarization method such as a truncated rice binarization method, a K-th order Exp_Golomb binarization method, a limited K-th order Exp_Golomb binarization method, a fixed-length binarization method, a unary binarization method or a truncated unary binarization method, etc. may be used.

When entropy encoding/decoding the information about motion compensation, a context model may be determined by using at least one piece of information about motion compensation of a neighboring block adjacent to the current block, information about previously encoded/decoded motion compensation, information about the depth of the current block, and information about the size of the current block.

In addition, when entropy encoding/decoding the information about motion compensation, entropy encoding/decoding may be performed by using at least one piece of information about motion compensation of a neighboring block, information about previously encoded/decoded motion compensation, information about the depth of the current block, and information about the size of the current block as a prediction value for information about motion compensation of the current block.

Inter encoding/decoding process may be performed for each of luma and chroma signals. For example, in the inter encoding/decoding process, at least one method of obtaining an inter-prediction indicator, generating a motion vector candidate list, deriving a motion vector, and performing motion compensation may be differently applied for a luma signal and a chroma signal.

Inter encoding/decoding process may be equally performed for luma and chroma signals. For example, in the inter encoding/decoding process being applied for the luma signal, at least one of an inter-prediction indicator, a motion vector candidate list, a motion vector candidate, a motion vector, and a reference picture may be applied to the chroma signal.

The methods may be performed in the encoder and the decoder in the same manner. For example, in the inter encoding/decoding process, at least one method of deriving a motion vector candidate list, deriving a motion vector candidate, deriving a motion vector, and performing motion compensation may be applied in the encoder and the decoder equally. In addition, orders of applying the methods may be different in the encoder and the decoder.

The embodiments of the present invention may be applied according to the size of at least one of a coding block, a prediction block, a block, and a unit. Here, the size may be defined as the minimum size and/or the maximum size in order to apply the embodiments, and may be defined as a fixed size to which the embodiment is applied. In addition, a first embodiment may be applied in a first size, and a second embodiment may be applied in a second size. That is, the embodiments may be multiply applied according to the size. In addition, the embodiments of the present invention may be applied only when the size is equal to or greater than the minimum size and is equal to or less than the maximum size. That is, the embodiments may be applied only when the block size is in a predetermined range.

For example, only when the size of the encoding/decoding target block is equal to or greater than 8×8, the embodiments may be applied. For example, only when the size of the encoding/decoding target block is equal to or greater than 16×16, the embodiments may be applied. For example, only when the size of the encoding/decoding target block is equal to or greater than 32×32, the embodiments may be applied. For example, only when the size of the encoding/decoding target block is equal to or greater than 64×64, the embodiments may be applied. For example, only when the size of the encoding/decoding target block is equal to or greater than 128×128, the embodiments may be applied. For example, only when the size of the encoding/decoding target block is 4×4, the embodiments may be applied. For example, only when the size of the encoding/decoding target block is equal to or less than 8×8, the embodiments may be applied. For example, only when the size of the encoding/decoding target block is equal to or greater than 16×16, the embodiments may be applied. For example, only when the size of the encoding/decoding target block is equal to or greater than 8×8 and is equal to or less than 16×16, the embodiments may be applied. For example, only when the size of the encoding/decoding target block is equal to or greater than 16×16 and is equal to or less than 64×64, the embodiments may be applied.

The embodiments of the present invention may be applied according to a temporal layer. An identifier for identifying the temporal layer to which the embodiment can be applied may be signaled, and the embodiments may be applied for the temporal layer specified by the identifier. Here, the identifier may be defined as indicating the minimum layer and/or the maximum layer to which the embodiment can be applied, and may be defined as indicating a particular layer to which the embodiment can be applied.

For example, only when the temporal layer of the current picture is the lowest layer, the embodiments may be applied. For example, only when a temporal layer identifier of the current picture is zero, the embodiments may be applied. For example, only when the temporal layer identifier of the current picture is equal to or greater than one, the embodiments may be applied. For example, only when the temporal layer of the current picture is the highest layer, the embodiments may be applied.

As described in the embodiment of the present invention, a reference picture set used in processes of reference picture list construction and reference picture list modification may use at least one of reference picture lists L0, L1, L2, and L3.

According to the embodiments of the present invention, when a deblocking filter calculates boundary strength, at least one to at most N motion vectors of the encoding/decoding target block may be used. Here, N indicates a positive integer equal to or greater than 1 such as 2, 3, 4, etc.

In motion vector prediction, when the motion vector has at least one of a 16-pixel (16-pel) unit, a 8-pixel (8-pel) unit, a 4-pixel (4-pel) unit, an integer-pixel (integer-pel) unit, a ½-pixel (½-pel) unit, a ¼-pixel (¼-pel) unit, a ⅛-pixel (⅛-pel) unit, a ¹⁄₁₆-pixel (¹⁄₁₆-pel) unit, a ¹⁄₃₂-pixel (¹⁄₃₂-pel) unit, and a ¹⁄₆₄-pixel (¹⁄₆₄-pel) unit, the embodiments of the present invention may be applied. In addition, in performing motion vector prediction, the motion vector may be optionally used for each pixel unit.

A slice type to which the embodiments of the present invention may be defined and the embodiments of the present invention may be applied according to the slice type.

For example, when the slice type is a T (Tri-predictive)-slice, a prediction block may be generated by using at least three motion vectors, and may be used as the final prediction block of the encoding/decoding target block by calculating a weighted sum of at least three prediction blocks. For example, when the slice type is a Q (Quad-predictive)-slice, a prediction block may be generated by using at least four motion vectors, and may be used as the final prediction block of the encoding/decoding target block by calculating a weighted sum of at least four prediction blocks.

The embodiment of the present invention may be applied to inter prediction and motion compensation methods using motion vector prediction as well as inter prediction and motion compensation methods using a skip mode, a merge mode, etc.

The shape of the block to which the embodiments of the present invention is applied may have a square shape or a non-square shape.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in an apparatus for encoding/decoding an image.

The invention claimed is:
1. A method of decoding an image, the method comprising:
  deriving multiple motion vectors for a current block according to an inter-prediction direction of the current block;
  determining multiple prediction blocks for the current block by using the multiple motion vectors; and
  obtaining a final prediction block for the current block based on a weighted sum of the multiple prediction blocks, and
  wherein a weight of the current block for the weighted sum is derived based on a weight of a neighboring block of the current block.
2. The method of claim 1, wherein the inter-prediction direction indicates uni-directional or bi-directional prediction.
3. The method of claim 1, wherein the weight is determined differently for each of the multiple prediction blocks.
4. A method of encoding an image, the method comprising:
  determining multiple prediction blocks for the current block; and
  determining a final prediction block for the current block based on a weighted sum of the multiple prediction blocks, and
  wherein a weight of the current block for the weighted sum is derived based on a weight of a neighboring block of the current block.
5. The method of claim 4, wherein the weight is determined differently for each of the multiple prediction blocks.
6. A non-transitory computer readable recording medium comprising a bitstream,
  the bitstream includes:
  information about a merge index identifying respective motion information of multiple merge candidate lists, in a decoding method,
  wherein the merge index is used for deriving multiple motion information for the current block,
  wherein the multiple motion information is used to determine multiple prediction blocks for the current block,
  wherein a weighted sum of the multiple prediction blocks is used for obtaining a final prediction block of the current block, and
  wherein a weight of the current block for the weighted sum is derived based on a weight of a neighboring block of the current block.

* * * * *